US009152933B2

(12) United States Patent
Wellman

(10) Patent No.: US 9,152,933 B2
(45) Date of Patent: Oct. 6, 2015

(54) FLEET MANAGEMENT SYSTEM

(75) Inventor: Timothy A. Wellman, Coldwater, OH (US)

(73) Assignee: Crown Equipment Corporation, New Bremen, OH (US)

( * ) Notice: Subject to any disclaimer, the term of this patent is extended or adjusted under 35 U.S.C. 154(b) by 33 days.

(21) Appl. No.: 13/274,435

(22) Filed: Oct. 17, 2011

(65) Prior Publication Data

US 2012/0046809 A1    Feb. 23, 2012

Related U.S. Application Data

(63) Continuation of application No. 11/956,022, filed on Dec. 13, 2007, now Pat. No. 8,060,400.

(60) Provisional application No. 60/869,845, filed on Dec. 13, 2006.

(51) Int. Cl.
*G06Q 10/00* (2012.01)
*G06Q 10/06* (2012.01)
(Continued)

(52) U.S. Cl.
CPC ....... *G06Q 10/06* (2013.01); *B66F 9/24* (2013.01); *G05D 1/0282* (2013.01); *G06Q 10/0631* (2013.01); *G06Q 10/0639* (2013.01); *G06Q 10/06316* (2013.01); *G06Q 10/06398* (2013.01); *G05D 2201/0216* (2013.01)

(58) Field of Classification Search
CPC .... G06F 17/5095; G06F 2015/00; B66F 9/24
USPC ............... 701/1, 2, 35, 70, 71; 705/7, 11, 34, 705/7.11, 7.13
See application file for complete search history.

(56) References Cited

U.S. PATENT DOCUMENTS

| 5,211,115 A * | 5/1993 | Maier et al. ............ 104/288 |
| 5,610,372 A * | 3/1997 | Phillips et al. ........ 177/25.14 |
| 6,430,488 B1 * | 8/2002 | Goldman et al. ........... 701/36 |

(Continued)

FOREIGN PATENT DOCUMENTS

WO    2005069203 A2    7/2005

OTHER PUBLICATIONS

European Patent Office, Extended European Search Report, Oct. 19, 2011.

*Primary Examiner* — Scott Zare
*Assistant Examiner* — Rokib Masud
(74) *Attorney, Agent, or Firm* — Stevens & Showalter, LLP

(57) ABSTRACT

Position dependent operation of a materials handling vehicle, comprises utilizing a processor on the materials handling vehicle to communicate across a wireless computing environment to a corresponding server computer via a transceiver on the materials handling vehicle. Operation further comprises obtaining from at least one device on the materials handling vehicle, information relating to the position of the materials handling vehicle and communicating the obtained position related information to the server computer. The operation still further comprises receiving a command from the server computer to perform a predetermined action, wherein the command is based upon the position related information of the materials handling vehicle relative to a position of a point of interest known by the server, and communicating information across a vehicle network bus to at least one component of the materials handling vehicle to perform the predetermined action in response to the received command.

14 Claims, 17 Drawing Sheets

(51) Int. Cl.
  *G05D 1/02* (2006.01)
  *B66F 9/24* (2006.01)

(56) References Cited

U.S. PATENT DOCUMENTS

| | | | | |
|---|---|---|---|---|
| 6,552,649 B1 * | 4/2003 | Okada et al. | ............ | 340/5.61 |
| 7,583,413 B2 * | 9/2009 | Nojiri et al. | ............ | 358/3.24 |
| 2002/0070862 A1 | 6/2002 | Francis et al. | | |
| 2003/0236601 A1 | 12/2003 | McLeod et al. | | |
| 2004/0049324 A1 * | 3/2004 | Walker | ............ | 701/1 |
| 2004/0167689 A1 | 8/2004 | Bromley et al. | | |
| 2004/0260467 A1 | 12/2004 | Wehrlen et al. | | |
| 2005/0038581 A1 | 2/2005 | Kapolka | | |
| 2005/0240378 A1 * | 10/2005 | Smith et al. | ............ | 702/188 |

\* cited by examiner

FLEET MANAGEMENT SYSTEM

CROSS REFERENCE TO RELATED APPLICATIONS

This application is a continuation of U.S. patent application Ser. No. 11/956,022, entitled FLEET MANAGEMENT SYSTEM, filed Dec. 13, 2007, now allowed, which claims the benefit of U.S. Provisional Patent Application Ser. No. 60/869,845 filed Dec. 13, 2006 entitled "FLEET MANAGEMENT SYSTEM", the disclosures of which are hereby incorporated by reference. Further, this application is related to U.S. patent application Ser. No. 11/956,045, entitled "FLEET MANAGEMENT SYSTEM", filed Dec. 13, 2007, which is also hereby incorporated by reference.

BACKGROUND OF THE INVENTION

Wireless strategies may be deployed by business operations, including distributors, retail stores, manufacturers, etc., to improve the efficiency and accuracy of business operations. Wireless strategies may also be deployed by such business operations to avoid the insidious effects of constantly increasing labor and logistics costs. In a typical wireless implementation, workers are linked to a management system executing on a corresponding computer enterprise via a mobile wireless transceiver. The wireless transceiver may be used as an interface to the management system to direct workers in their tasks, e.g., by instructing workers where and/or how to pick, pack, put away, move, stage, process or otherwise manipulate the items within the operator's facility. The wireless transceiver may also be used in conjunction with a suitable input device to scan, sense or otherwise read tags, labels or other identifiers to track the movement of designated items within the facility.

In order to move items about the operator's facility, workers often utilize materials handling vehicles, including for example, forklift trucks, hand and motor driven pallet trucks, etc. However, disruptions in the operation of such materials handling vehicles impact the ability of the management system and corresponding wireless strategy to obtain peak operating efficiency. Moreover, conventional enterprise software, including corresponding management systems do not account for, track, communicate with or otherwise provide insight into the availability, health, status, suitability of the materials handling vehicles to perform the required work. Still further, conventional enterprise software, including corresponding management systems do not provide tools to manage access to, and operation of, the available materials handling vehicles within the facility in an efficient and integrated manner.

BRIEF SUMMARY OF THE INVENTION

According to aspects of the present invention, a method of wirelessly interacting with a materials handling vehicle to implement position dependent operation of the materials handling vehicle, comprises utilizing a processor on a materials handling vehicle to communicate across a wireless computing environment to a corresponding server computer via a transceiver on the materials handling vehicle. The method further comprises obtaining by the processor from at least one device on the materials handling vehicle, information relating to the position of the materials handling vehicle and communicating the obtained position related information from the materials handling vehicle to the server computer. The method still further comprises receiving a command from the server computer by the materials handling vehicle to perform a predetermined action, wherein the command is based upon the position related information of the materials handling vehicle relative to a position of a point of interest known by the server. The method yet further comprises communicating information across a vehicle network bus by the processor on the materials handling vehicle, to at least one component of the materials handling vehicle, to perform the predetermined action in response to the received command.

According to still further aspects of the present invention, a system to implement position dependent operation of a materials handling vehicle, comprises a transceiver, a processor and a computer-readable storage device, each provided on a materials handling vehicle. The transceiver is configured for wireless data communication across a wireless computing environment. The computer-readable storage device comprises an executable program stored thereon, wherein the program instructs the processor to communicate across a wireless computing environment to a corresponding server computer via the transceiver and to obtain from at least one device on the materials handling vehicle, information relating to the position of the materials handling vehicle. The program further instructs the processor to communicate the obtained position related information from the materials handling vehicle to the server computer and receive a command from the server computer to perform a predetermined action, wherein the command is based upon the position related information of the materials handling vehicle relative to a position of a point of interest known by the server. The program still further instructs the processor to communicate information across a vehicle network bus by the processor on the materials handling vehicle, to at least one component of the materials handling vehicle, to perform the predetermined action in response to the received command.

BRIEF DESCRIPTION OF THE SEVERAL VIEWS OF THE DRAWINGS

The following detailed description of various embodiments of the present invention can be best understood when read in conjunction with the following drawings, where like structure is indicated with like reference numerals, and in which.

DETAILED DESCRIPTION OF THE INVENTION

In the detailed description, reference is made to the accompanying drawings that form a part hereof, and in which is shown by way of illustration, and not by way of limitation, specific embodiments in which the invention may be practiced. It is to be understood that other embodiments may be utilized and that changes may be made without departing from the spirit and scope of various embodiments of the present invention.

According to various aspects of the present invention, systems of hardware and software are provided for enabling mobile assets to communicate across a wireless network environment. Systems, computer-implemented methods and computer program products are also provided for leveraging wireless communication and/or processing capabilities of mobile assets against a robust software solution to implement enterprise wide asset management functions, to integrate mobile asset data into existing enterprise workflows and/or to enable trusted third party integration into the enterprise for enhanced asset and/or workflow management.

System Architecture

Aspects of the present invention comprise systems that enable mobile assets to wirelessly communicate with applications deployed in an enterprise computing environment. As used herein, a mobile asset is any equipment that is capable of moving or otherwise being moved about a work site. Exemplary mobile assets include materials handling vehicles, such as forklift trucks, reach trucks, turret trucks, walkie stacker trucks tow tractors, hand operated pallet trucks, etc.

Figure 1:
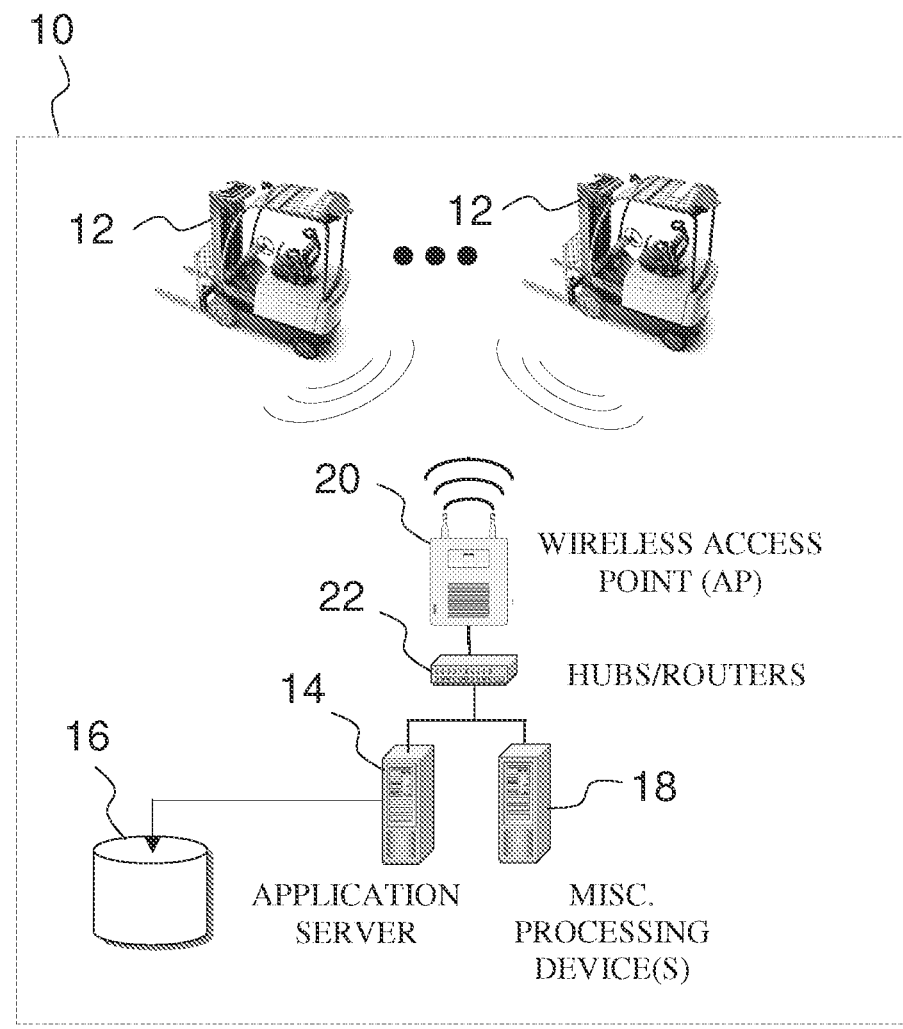
FIG. 1 is a schematic illustration of a wireless communication system that allows mobile devices, such as forklift trucks and other industrial vehicles to wirelessly communicate with a server.

Referring now to the drawings and particularly to FIG. 1, an exemplary computing environment 10 is illustrated, which includes components that support wireless communication capabilities. A plurality of mobile assets 12, such as materials handling vehicles (shown as forklift trucks for convenience of illustration), each include a communications device that enables that mobile asset 12 to wirelessly communicate with a processing device, such as a mobile asset application server 14. The mobile asset application server 14 may further interact with a data resource 16, e.g., one or more databases, data stores or other sources of information, to facilitate interaction with the mobile assets 12 as will be described in greater detail herein.

The computing environment 10 may further support additional processing devices 18, which may comprise for example, servers, personal computers, notebook computers, transactional systems, appliance or pervasive computing devices such as personal data assistants (PDA), palm computers, cellular access processing devices, special purpose computing devices, network storage device and/or other devices capable of interacting with the computing environment 10. One or more of the processing devices 18 may also communicate with the mobile assets 12 and/or the mobile asset application server 14 across the computing environment 10.

The wireless communication architecture may be based upon a standard wireless fidelity (WiFi) infrastructure, such as may be deployed using standard 802.11 b/g wireless networks for a communications protocol. However, any other suitable protocol may alternatively be implemented. For example, one or more wireless access points 20 may be utilized to relay data between a wireless transceiver of each mobile asset 12 and one or more wired devices of the computing environment 10, e.g., the mobile asset application server 14. In this regard, each access point 20 may comprise any device capable of relaying data between wired and wireless connections. The number of access points 20 and the placement thereof may be determined based upon the specific implementation. For example, in a relatively large site, e.g., a large warehouse, distribution facility, retail outlet, etc., numerous access points 20 may be required to provide wireless communications coverage across a designated area in which the mobile assets 12 are to be operated.

Moreover, the computing environment 10 may be supported by one or more hubs 22 and/or other networking components that interconnect the various hardware and/or software processing devices, including for example, routers, firewalls, network interfaces and corresponding interconnections. The particular networking components provided in the computing environment 10 may thus be selected to support one or more intranets, extranets, local area networks (LAN), wide area networks (WAN), wireless networks (WiFi), the Internet, including the world wide web, and/or other arrangements for enabling communication across the computing environment 10, either real time or otherwise, e.g., via time shifting, batch processing, etc.

Figure 2:
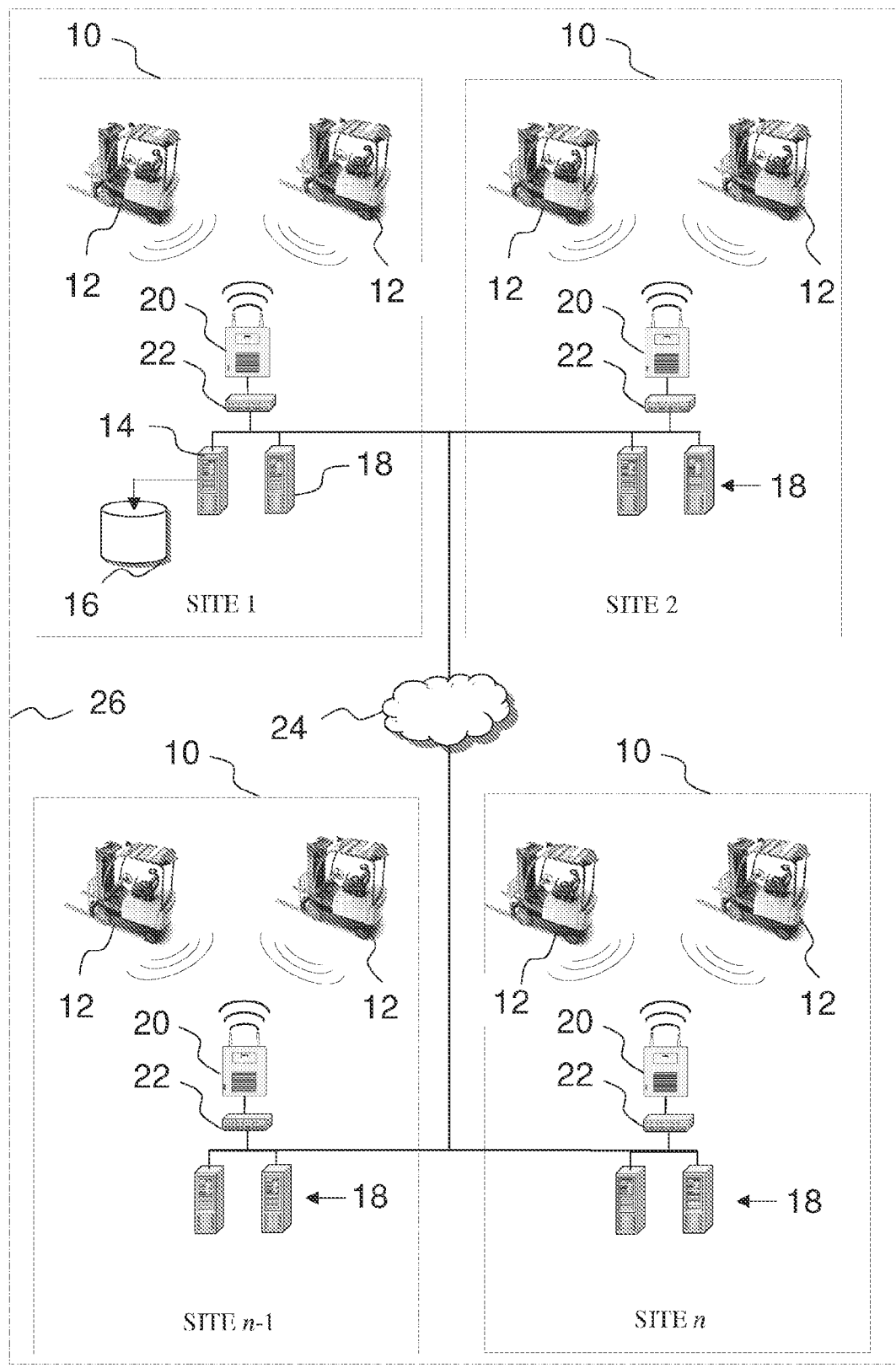
FIG. 2 is a schematic illustration of the wireless communication system of FIG. 1, in an implementation that is distributed across multiple sites.

Referring to FIG. 2, a distributed enterprise architecture may also be implemented, for example, wherein several local computing environments 10 are connected across a network 24, such as a LAN, WAN, the Internet, etc. Each local computing environment 10 may represent, for example, one of n different sites that comprise a larger computing enterprise 26, where the enterprise 26 provides some form of common network control or supervision over the associated local computing environments 10. For example, an entity may have operations at multiple distinct physical site locations, yet the computing systems at each site are interconnected, capable of communication or are otherwise integrated. Under this configuration, each site may maintain its own mobile asset application server 14, or the enterprise 26 may manage each site 1-n from a centralized location. For purposes of illustration, the mobile asset application server 14 is shown as residing at site 1. Under this arrangement, mobile assets 12 at sites 2-n may communicate with the mobile asset application server 14 across the network 24.

Figure 3:
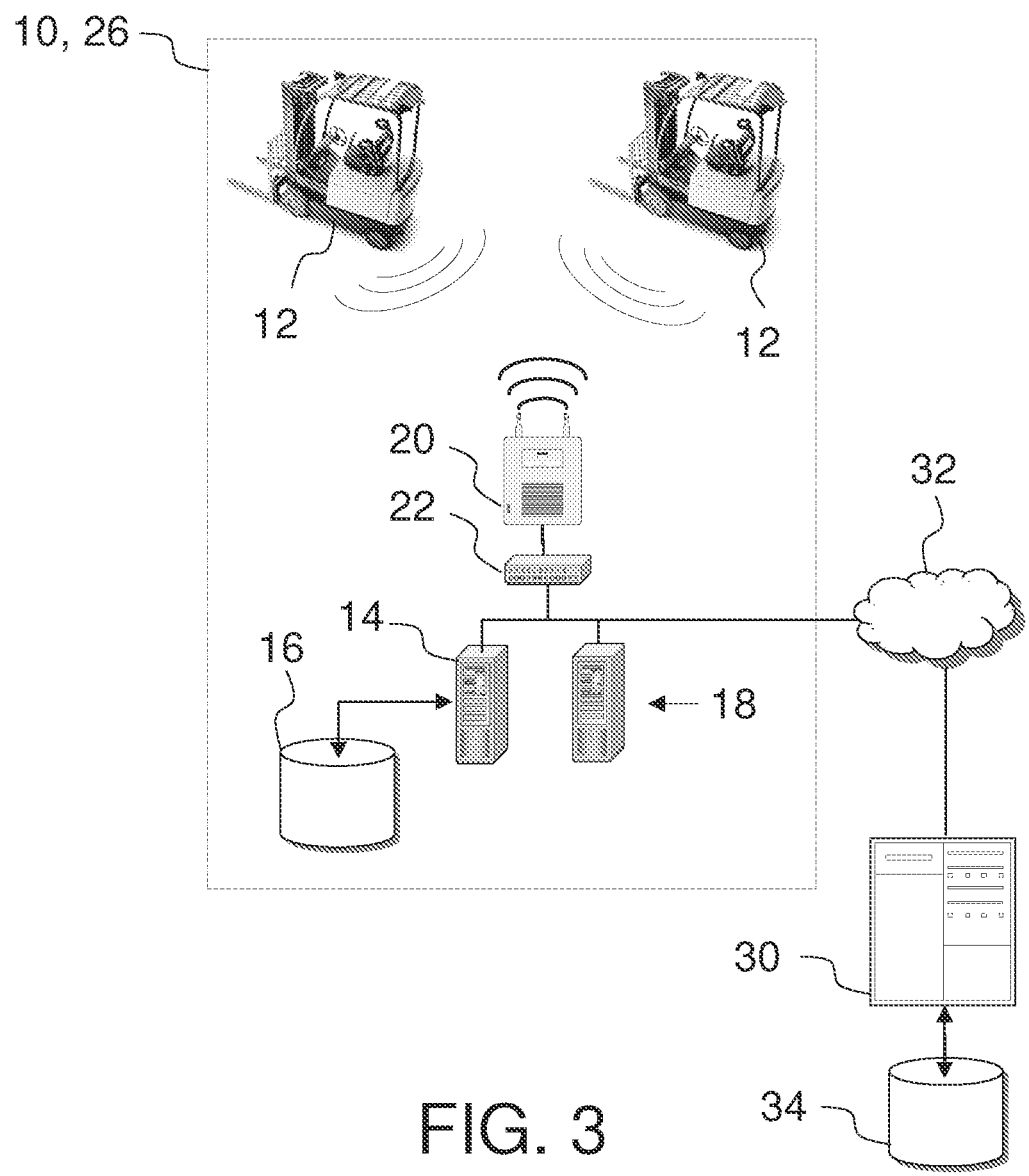
FIG. 3 is a schematic illustration of the wireless communication system of FIG. 1 in an implementation that is further communicably coupled to a remote server.

Referring to FIG. 3, in yet another exemplary implementation, one or more computing environments 10 and/or computing enterprises 26 may further communicate with a remote server 30, such as across the network 32. The remote server 30 may comprise, for example, a third party server that interacts with the mobile assets 12, the mobile asset application server 14 and/or other processing devices 18 of the computing environment(s) 10/computing enterprise(s) 26. The remote server 30 may further interact with a data resource 34, e.g., one or more databases, data stores or other sources of information, as will be described in greater detail herein. In this configuration, the network 32 may be the same as, or different from the network 24 seen in FIG. 2. For example, both networks 24, 32 may comprise the Internet. As another example, the network 24 may comprise a LAN or WAN and the network 32 may comprise the Internet.

Figure 4:
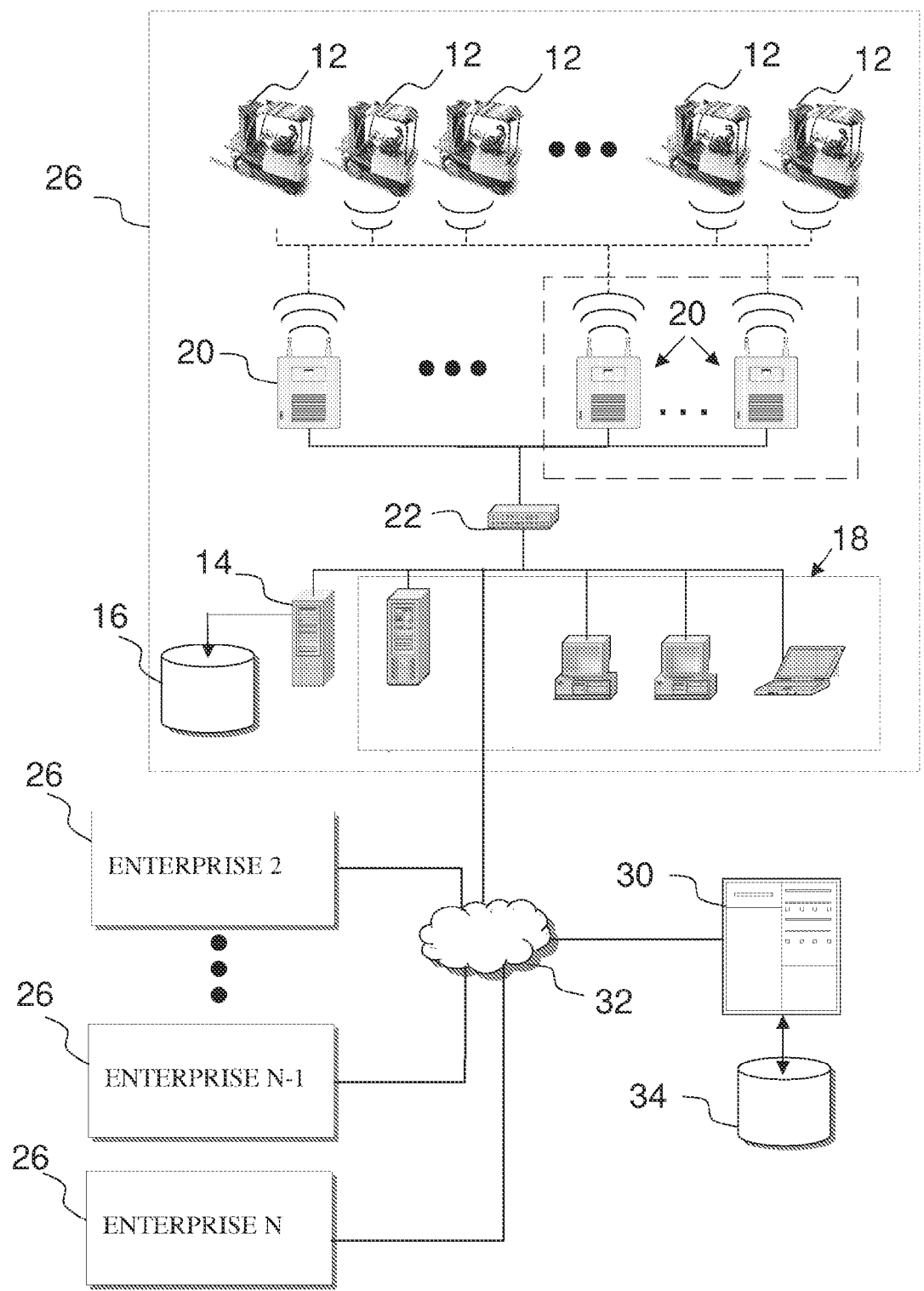
FIG. 4 is a schematic illustration of a plurality of enterprise systems communicably coupled to a common server, where each enterprise comprises an implementation of the wireless communication system of FIG. 1.

Referring to FIG. 4, the remote server 30 may interact with multiple computing enterprises 26, where each computing enterprise 26 may have one or more sites, e.g., local computing environments 10 as shown in FIG. 2. This allows, for example, a third party such as the manufacturer of the mobile assets 12 to electronically communicate with participating computer enterprises 26, including communications with select mobile assets 12, a select mobile asset communications server 14, a select data resource 16 and/or other processing device 18 within a corresponding enterprise 26, as will be described in greater detail herein. FIG. 4 further illustrates an exemplary enterprise 26 as having a computing environment including multiple processing devices 18 as well as multiple access points 20 to illustrate the flexibility of these exemplary implementations.

Referring to FIGS. 1-4 generally, it can be seen that, depending upon the particular implementation, data corresponding to wireless communications with mobile assets 12 may be locally maintained, e.g., at a particular site such as a local computing environment 10. Data corresponding to wireless communications with mobile assets 12 may also be shared across sites of a larger computing enterprise 26. Still further, data corresponding to wireless communications with mobile assets 12 may be shared between sites/enterprises 10, 26 etc., and remote server(s) 30, which may be maintained by a trusted third party, such as a mobile asset manufacturer, or multiple trusted third parties.

Wireless Communication System Interfaces

Conceptually, at least three general classes of interface may be provided for interacting with the wireless communication systems illustrated in FIGS. 1-4. The first class of interface is provided at a mobile asset 12. The second class of interface is provided at an intra-enterprise fixed location and the third class of interface is provided at an inter-enterprise location.

An "intra-enterprise fixed location" corresponds to a fixed location processing device (not installed on a mobile asset 12) that is under the control and/or supervision of an entity associated with a corresponding enterprise 26. As an example, the second (intra-enterprise) class of interface may be implemented by a software client that is executed on a personal computer, laptop, etc., within a corresponding local computing environment 10 or is otherwise part of the enterprise 26, which is logged into the mobile asset application server 14. The software client may alternatively be logged into a processing device 18, such as a warehouse management system application that interacts with one or more mobile assets 12 and/or the mobile asset application server 14, etc.

An "inter-enterprise" location corresponds to a remote location outside the control/supervision of a computing environment 10 or associated enterprise 26. For example, a third (inter-enterprise) class of interface may be implemented by a software client that is executed on a remote location processing device, such as a personal computer, laptop, etc., logged into the remote server 30, which may be operated by a trusted third party, such as an equipment manufacturer. The inter-enterprise interface may enable interaction with data stored in a corresponding data resource 34, which was obtained via communication with one or more mobile asset information servers 14 and/or mobile assets 12 from one or more enterprises 26. The inter-enterprise interface may also/alternatively enable interaction between the remote server 30 and one or more of the mobile assets 12 or the mobile asset application servers 14 across one or more corresponding computing environments 10/enterprises 26. A Web-browsing style of client may be utilized to implement one or more of the various classes of interface as will be described in greater detail below.

The role of the user at a particular interface may influence how that user interacts with the system according to various aspects of the present invention. For example, an enterprise user who wishes to interact with the system at a mobile asset interface may assume the role of a mobile asset operator, an intra-enterprise authorized user who may not be the asset operator, such as a supervisor/manager, an information technology support person, a mechanic/service person, etc. Likewise, a third party user may access the system via a mobile asset interface, such as when implementing the role of an asset/component/accessory/peripheral supplier or manufacturer, technician, support person, sales representative, etc. Each user may have different needs, goals, capabilities, limitations and requirements when interacting with the wireless communication system from the mobile asset interface, examples of which are described herein.

Likewise, an enterprise user at an intra-enterprise fixed location interface of the wireless communication system, e.g., a user at a computer logged into a corresponding mobile asset application server 14, may implement any number of roles, including for example: an intra-enterprise authorized user, such as a supervisor/manager; an information technology administrator or support person; a mechanic/service person; an asset operator who is not currently operating a mobile asset, etc. Again, each user may have different needs, goals, capabilities, limitations and requirements when interacting with the wireless communication system from the intra-enterprise fixed location interface.

The inter-enterprise (remote) interface may be utilized, for example, by a trusted third party, such as an asset manufacturer, supplier, maintenance provider, sales representative, etc. Similarly, asset component and asset peripheral manufacturers, suppliers, maintenance providers, sales representatives, etc., may also interact with the wireless communications system, e.g., via an inter-enterprise remote interface. Whether or not an inter-enterprise remote interface/remote server 30 can interact with a particular enterprise 26 will likely depend upon the specific implementation of the various aspects of the wireless communications system described in greater detail herein.

The Mobile Asset Interface

Figure 5A:
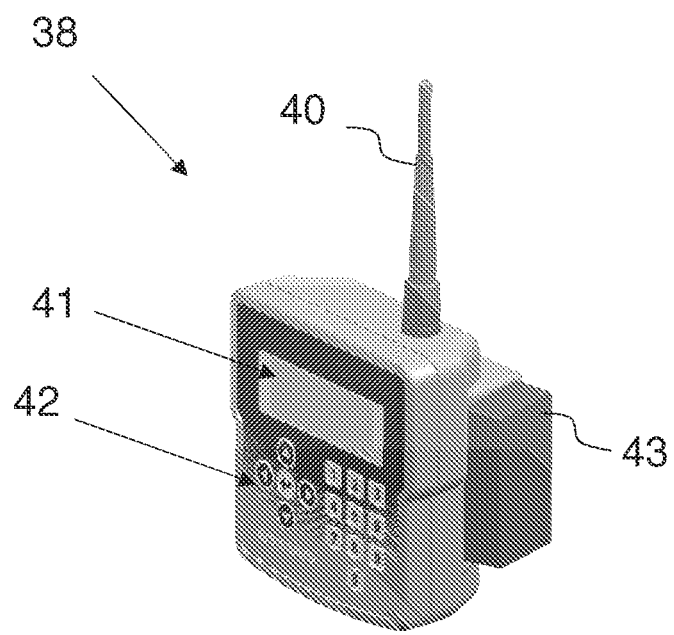
FIG. 5A is an illustration of an exemplary mobile asset information linking device for enabling wireless communication.

Referring to FIG. 5A, an exemplary mountable mobile asset information linking device 38 is illustrated. The mobile asset information linking device 38 implements a mobile asset interface that facilitates interaction with the user at the mobile asset 12, e.g., a materials handling vehicle, and is enabled by hardware and software as will be described in greater detail herein. The illustrated mobile asset information linking device 38 includes, in general, an antenna 40 that couples to a transceiver for wireless communication (not shown in FIG. 5A), a display 41 and controls 42 for interacting with a user. Although shown for purposes of illustration as an external antenna 40, the antenna may alternatively be internal to the linking device or otherwise configured. The information linking device 38 may further include additional features, such as a reading device 43 such as a fob reader or other device for electronically obtaining operator login information. Operator login procedures are described in greater detail herein.

Figure 5B:
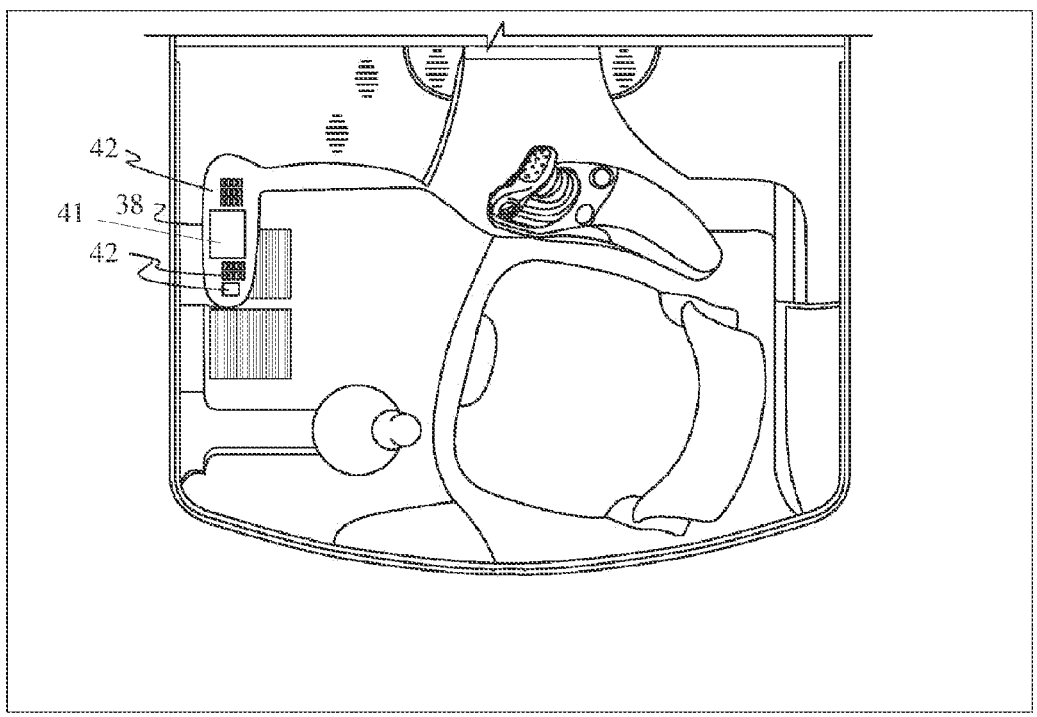
FIG. 5B is an exemplary operator's compartment of a material handling vehicle illustrating a mobile asset information linking device for enabling wireless communication, which is integrated into a vehicle control area.

The mobile asset information linking device 38 may alternatively be integrated with (built into) a corresponding mobile asset 12 as illustrated in FIG. 5B. As shown for purposes of illustration, the mobile asset information linking device 38 is integrated into a work area, e.g., a console of an operator's compartment. Under this configuration, the features of the mobile asset interface 38, described more fully herein, can be integrated directly with other existing vehicle features and functions typically implemented on the display and corresponding controls.

Within a given computing enterprise 26, site 10, or other suitable computing environment, each mobile asset information linking device 38 is assigned or otherwise derives a unique identifier that is known or made known to the corresponding mobile asset application server 14. Thus, using the known identifiers, the mobile asset application server 14 may conduct targeted communications with specific mobile asset information linking devices 38, or broadcast information to groups or all of the mobile asset information linking devices 38 that are associated with that mobile asset application server 14.

According to an aspect of the present invention, to initiate communication between the mobile asset application server 14 and a mobile asset information linking device 38, an acknowledgment sequence is implemented. For example, the mobile asset application server 14 may send out a request or ping a specific mobile asset information linking device 38 on a mobile asset 12. If the pinged mobile asset information linking device 38 responds, an exchange of information between the mobile asset information linking device 38 and the mobile asset application server 14 occurs.

Figure 6:
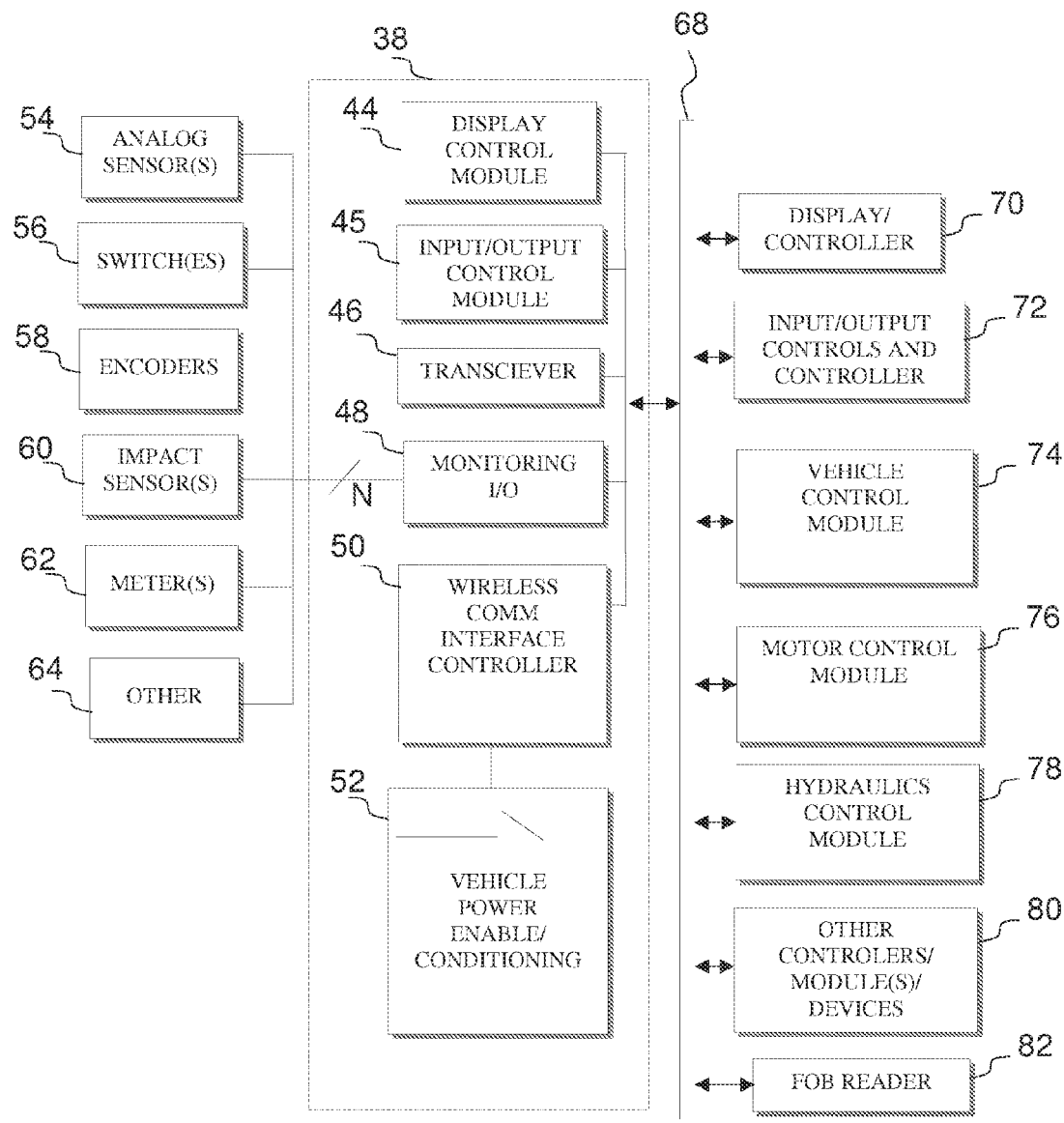
FIG. 6 is a block diagram of an exemplary integration of the components of a mobile asset information linking device into the control system of a mobile asset.

Referring to FIG. 6, a block diagram illustrates an exemplary implementation of a mobile asset information linking device 38 that has been integrated into a control system of a corresponding mobile asset 12, such as a materials handling vehicle. The integrated system shown in FIG. 6 may be implemented regardless of whether the mobile asset information linking device 38 is mounted to a mobile asset 12 as an add-on (FIG. 5A) or whether the mobile asset information linking device 38 is integrated into the corresponding mobile asset 12 (FIG. 5B). The mobile asset information linking device 38 comprises a display control module 44 for controlling the display 41 (shown in FIGS. 5A, 5B) and an input/output control module 45 that is associated with the controls 42 (also shown in FIGS. 5A, 5B). The mobile asset information linking device 38 further comprises a transceiver 46, a monitoring input/output module 48, a wireless communications interface controller 50 and vehicle power enabling/conditioning circuitry 52.

The transceiver 46 may provide, for example, two-way communication with processing devices, including server computers such as the mobile asset application server 14 across the corresponding computing environment. The monitoring input/output module 48 may be utilized to receive sensor and control inputs and/or to control outputs such as horns, buzzers, lights and other asset components and/or devices. As just a few exemplary illustrations, the monitoring input/output module 48 may interface with analog sensors 54, switches 56, encoders and other similar input devices 58, impact sensor(s) 60, meter input(s) 62 and any other analog or digital input and/or output signals 64 to integrate such information into the wireless communications system. The monitoring input/output module 48 allows data logging capabilities which can be used, for example, to monitor travel usage meters, hydraulic usage meters, steering usage meters, operator usage meters, miscellaneous sensor inputs and other types of asset related data.

Information detected by the monitoring input/output module 48 may be temporarily stored, collected, maintained, manipulated and/or otherwise processed, e.g., by a processor and corresponding memory (not shown in FIG. 6) in the interface controller 50 or other suitable processor and memory, which may be provided as part of the mobile asset electronics. Further, the collected information may be communicated to a corresponding mobile asset application server 14, for example, using the transceiver 46.

The interface controller 50 may comprise a suitable processor, memory, software, resident firmware, etc., to control the functions of the mobile asset information linking device 38 as described more fully herein. Moreover, the processor of the interface controller is configured to communicate with the transceiver 46 for wireless communication across the wireless computing environment to a corresponding server computer, e.g., the applications server 14. The mobile asset power enabling circuitry 52, where applicable, allows power to be provided to the mobile asset information linking device 38, even when the corresponding mobile asset 12, such as a materials handling vehicle, is powered down. Moreover, the mobile asset power enabling circuitry 52 can be tied to the mobile asset ignition to prevent mobile asset startup unless certain conditions are met, or to force mobile asset shut down, as schematically represented by the switch shown within box 52. As an example, mobile asset startup conditions may be evaluated by the interface controller 50 of the mobile asset information linking device 38 or other suitable processor before allowing the mobile asset 12 to be powered up and fully functional for operation.

In an illustrative implementation where a mobile asset 12 comprises a materials handling vehicle, such as a forklift truck, the components of the mobile asset information linking device 38 may be coupled to and/or communicate with other mobile asset system components via a suitable mobile asset network system 68, e.g., a vehicle network bus. The mobile asset network system 68 is any wired or wireless network, bus or other communications capability that allows electronic components of the mobile asset 12 to communicate with each other. As an example, the mobile asset network system 68 may comprise a controller area network (CAN) bus, ZigBee, Bluetooth, Local Interconnect Network (LIN), time-triggered data-bus protocol (TTP) or other suitable communication strategy. As will be described more fully herein, utilization of the mobile asset network system 68 enables seamless integration of the components of the mobile asset information linking device 38 into the native electronics including controllers of the mobile asset 12 and optionally, any electronics peripherals associated with the mobile asset 12 that integrate with and can communicate over the network system 68.

Thus, as an example, a processor provided on a materials handling vehicle, e.g., as provided within the interface controller 50 or otherwise integrated into the materials handling vehicle, may be configured to implement at least one function by wirelessly communicating with the application server via the transceiver 46 and by interacting with at least one component of the materials handling vehicle across the vehicle network bus, such as by communicating with at least one native control module 70, 72, 74, 76, 78, 80, 82 of the materials handling vehicle across the vehicle network system 68. Integration is further achieved where the event codes and other communications across the vehicle network bus are well understood by the information linking device 38, thus enabling interaction between the applications server 14, the information linking device 38 and the materials handling vehicle at the machine component level.

For example, the processor provided within the interface controller 50 or otherwise integrated into the materials handling vehicle may communicate configuration information to at least one component of the materials handling vehicle across the vehicle network bus and/or receive operational information from one or more components of the vehicle across the vehicle network system 68 that is conveyed to the applications server 14. The processor may also filter, manipulate or otherwise process information communicated across the vehicle network bus, numerous examples of which are described in greater detail herein.

The CAN protocol is a convenient network platform for mobile assets 12, such as material handling vehicles, as there is no addressing of subscribers or stations in the conventional network sense. Rather, the CAN defines a prioritized system of transmitted messages where the priority of a given message broadcast across the CAN is dependent upon an identifier code. That is, each CAN participant may broadcast a message that includes an identifier and the message to be communicated.

Each message may compete for bus access with messages generated by other participants on the CAN, and priority will typically be determined based upon the identifier codes. However, a message broadcast from a first participant can be received by all nodes or participants connected to the CAN bus. Each participant may be programmed to decide, e.g., based upon the identifier or other information encoded in the received message, whether that participant should take action based upon the received messages. The mobile asset network system 68 may alternatively comprise any other bus system or communications architectures. As such, each network participant may broadcast, unicast or otherwise communicate with one or more of the other participants of the mobile asset network system 68.

Where the information linking device 38 is connected to the mobile asset network system 68, communication is open and may be performed between components of or otherwise connected to the information linking device 38 and other mobile asset system components and modules, thus enabling a strong coupling of wireless features with core vehicle capabilities. For example, the mobile asset may include a component or module such as a display and corresponding display controller 70. The display may be a conventionally implemented device that provides vehicle operating status, maintenance messages, etc. Communication of the information linking device 38 with the display and display controller 70, e.g., via the network system 68 allows consolidation of displays and directs the vehicle operator to a single reference point for interaction with the vehicle and wireless capabilities.

As another example, the information linking device 38 may communicate with input/output controls and corresponding I/O controller 72, such as for controlling switches, buttons, levers, handles, pedals, etc., that are assigned to functions of the mobile asset. The information linking device 38 may also communicate with a vehicle control module (VCM) 74 that controls the electronic capabilities of the mobile asset, a motor control module 76 that controls the drive wheels of the vehicle, a hydraulics control module 78 that controls the hydraulics, e.g., the lift of the vehicle and any other controllers/modules and other electronics 80 that are associated with the mobile asset. Still further, the information linking device 38 may communicate with other miscellaneous devices such as a keyless entry fob reader 82 or any other devices that are attached to the vehicle.

The controllers/modules and other electronics 80, 82 may also include scanning technologies such as bar code scanners, RFID and other tag reading technologies, hardware for supporting warehouse management systems and other enterprise software, printers and other output devices as well as other technologies that an operator may currently utilize as separate components.

As an alternative to communication over the network system 68, components may be communicably coupled to the information linking device 38 via an input 64 coupled to the monitoring input/output module 48 or via other suitable input to the interface controller 50, such as where a given separate component, e.g., a tag reader, cannot communicate across the CAN bus or other suitable vehicle network system 68 of the mobile asset 12.

Regardless of whether various components communicate over the network system 68, e.g., vehicle components, or via the input 64 of the information linking device 38, the various components of the mobile asset 12, e.g., the I/O controller 72, the VCM 74, motor control module 76, hydraulics control module 78 and other controllers 80 can be integrated into an enterprise infrastructure by utilizing the mobile asset information linking device 38 to merge all information flowing into or out of the mobile asset 12 into a wirelessly communicated data stream that interacts with other enterprise resources.

In an illustrative implementation, the mobile asset information linking device 38 comprises a display 41 that may communicate across the mobile asset network system 68, e.g., CAN bus. This allows the display 41 to be shared with mobile asset modules outside of the device 38. Moreover, the mobile asset 12 may already comprise a suitable display, such as the display 70 that can communicate across the CAN bus, e.g., with the interface controller 50. Under this arrangement, the display 41 in the information linking device 38 may be optional. Similarly, the input/output control module 45 may be optional, e.g., where suitable controls capable of interfacing with the interface controller 50 are implemented by the input/output controls 72 of the mobile asset 12.

Thus, as an illustrative example, software on the applications server 14 may be utilized to store customization parameters that are utilized to customize one or more features of a materials handling vehicle. Based upon identification information provided from the materials handling vehicle to the applications server 14, e.g., identification of the particular materials handling vehicle or logged on operator, customization parameters may be received by the materials handling vehicle from the applications server 14 via the transceiver of its corresponding information linking device 38. The customization parameters may be used to reconfigure at least one feature of the materials handling vehicle, examples of which are described more fully herein.

As an illustrative example, the monitoring input/output module 48 may be utilized to couple control inputs and/or outputs to the processor in the corresponding wireless communications interface controller 50 via a connector. As illustrated, there are "N" wires that couple the connector to corresponding input and output components, shown as components 54, 56, 58, 60, 62 and 64. It may be that different vehicles will have different input/output requirements. Still further, events of the same type of input output device may operate differently, e.g., based upon the logic implemented, such as active high or active low, etc. Accordingly, a server administrator may map inputs and outputs for any vehicle by storing input/output pin programming parameters at the application server 14.

Thus, for example, the application server 14 may be used to customize and set up the definitions, parameters, etc. for each pin on the connector and convey this information to the vehicle so that the processor in the interface controller 50 may configure the input/output module 48 to identify the pins for the appropriate hardware installed thereto. Thus, the features of the wire assignments can be reconfigured according to the retrieved customization parameters associated with the vehicle identification. As such, the processor of the interface controller 50 may communicate with the plurality of electronic components, e.g., 54, 56, 58, 60, 62, 64 via the monitoring I/O module 48 based upon parameters that assign specific functions to each of the plurality of wires that couple the processor to the plurality of electronic components.

Data Collection

Information detected by the monitoring input/output module 48 or otherwise obtained by accessing the network system 68 may be temporarily stored, collected, maintained, manipulated and/or otherwise processed, e.g., by a processor and corresponding memory in the interface controller 50 or other suitable processor and memory, which may be provided as part of the mobile asset electronics. Further, the collected information may be communicated to the application server 14, for example, using the transceiver 46. Thus, the information linking device 38 may be used to facilitate the coupling of data logging from the mobile asset 12 to the asset application server 14. As will be described in greater detail herein, this approach can be used to create a history of operational parameter values that may vary over time, such as speed, temperature, battery state of charge, proprietary service codes, height, weight and other measurable parameters.

As an example, the exchange of information across the vehicle network system 68 of a materials handling vehicle may be monitored. If a predetermined event associated with the materials handling vehicle is detected, the processor provided within the interface controller 50 or otherwise integrated into the materials handling vehicle may be configured to implement a function in response to detecting a predetermined event by wirelessly communicating information associated with the event between a server computer, e.g., the applications server 14 and the materials handling vehicle via the transceiver 46. The processor of the interface controller 50 may also interact with at least one component of the materials handling vehicle across the vehicle network system 68 in response to the event to implement the function.

Thus, the data collection capabilities of the information linking device 38 may be utilized to implement event driven data archival activities. For example, the detection of a predetermined event may trigger the processor of the interface controller 50 to begin logging certain data, end logging certain data, archive a predetermined window of collected data and/or otherwise perform other prescribed operation(s). The information linking device 38 may also continually or periodically monitor certain vehicle parameters. If all monitored parameters are within prescribed tolerances, such logged data may be subsequently summarized, deleted, sent to the applications server 14, etc.

As an illustrative example, if one of the monitored parameters is speed, the system may log a sample of the truck speed at predetermined intervals. Over a prescribed period of time, if no events of interest are detected, then the system may only save the top speed, a computed average speed and/or some other measure.

Figure 7:
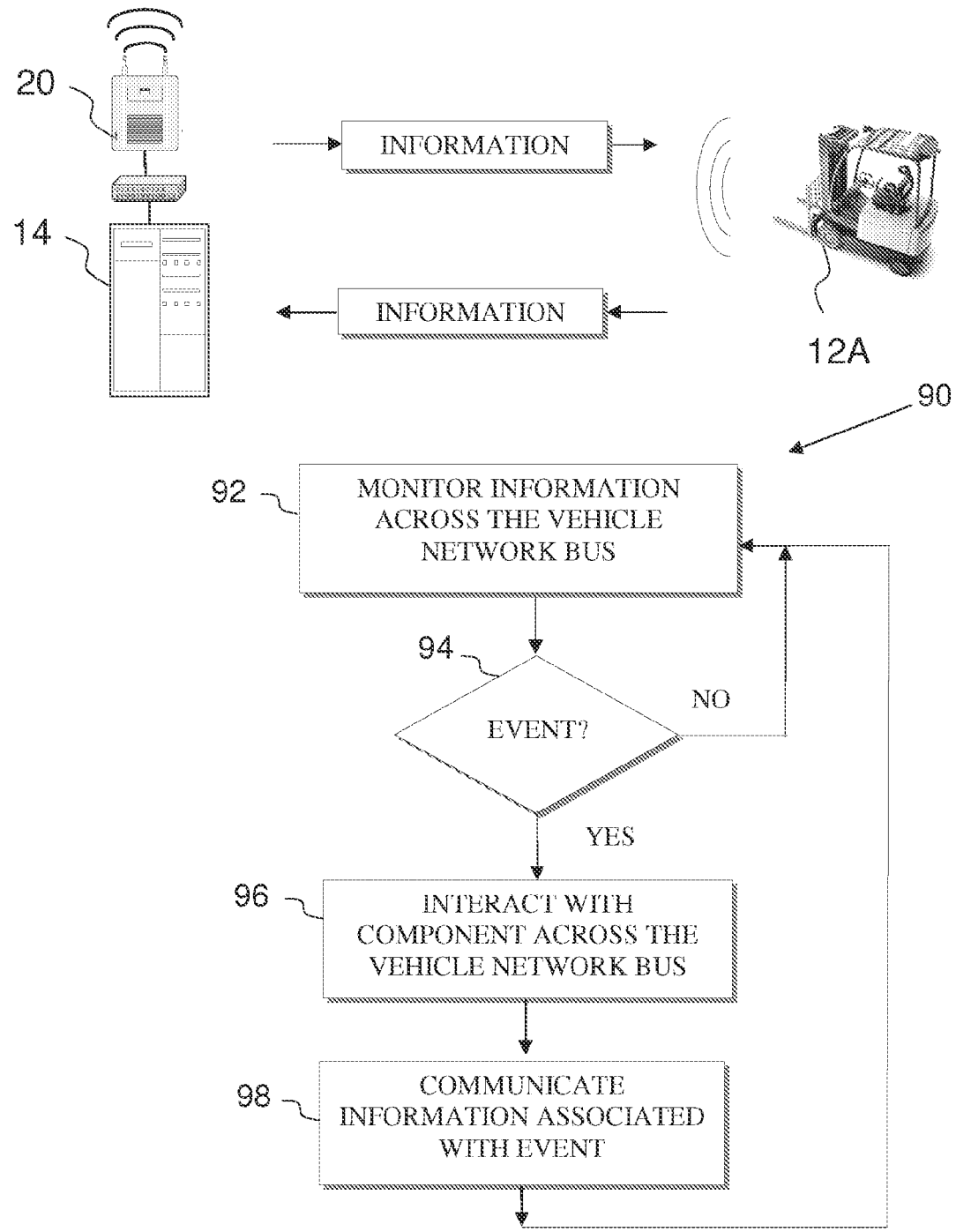
FIG. 7 is a block diagram of an exemplary implementation of event triggered data recording according to various aspects of the present invention.

Referring to FIG. 7, according to aspects of the present invention, a method 90 is illustrated for integrating materials handling vehicles with enterprise computing systems. Information is monitored across the vehicle network bus at 92, e.g., to create a data log. If a predetermined triggering event is detected at 94, any additional data may be communicated to the data log across the materials handling vehicle network bus at 96. The processor provided within the interface controller 50 or otherwise integrated into the materials handling vehicle may then communicate information associated with the event at 98, e.g., by creating an event report from the data log, where the event report may cover data gathered over a window of time, such as spanning from a time period before the triggering event to a time after the triggering event. The processor may also wirelessly communicate the generated event report to the application server 14.

If a triggering event is detected, such as the detection of a parameter that exceeds a predetermined tolerance, then the logged contents can be stored, e.g., by communicating the information to the application server 14. Thus for example, if the vehicle speed, load, or other measurable parameter exceeds a threshold or other defined condition, then specific data may be gathered, collected, assembled, etc. into an event report and such data may be communicated to the application server 14.

As another example, if an impact from one of the impact sensors is detected, e.g., if a detected impact exceeds one or more predetermined impact conditions, an event process may be triggered that creates an event report by saving logged data from a time window that may extend a predetermined time before the impact to a predetermined time after the impact. Additionally, the event may trigger the accumulation of damage data specific to the impact. For example, upon detecting an impact, certain vehicle components may be selected and polled, e.g., across the vehicle network bus to ascertain operating status information. Additionally, certain data may be desired regardless of the type of impact, such as by logging a timestamp, operator identification, etc. As such, a flight recorder function may be implemented to create a record of the event of interest.

As yet a further illustrative example, the triggering of an impact may be based upon an impact sensor detection that exceeds a predetermined threshold value. Such values may be stored as parameters on the application server 14 and may be communicated to the vehicle 12. As such, the conditions required to satisfy an impact type of event may be dynamically adjusted and customized by modifying parameters at the application server 14, and wirelessly communicating the modified parameters to the vehicle 12.

An asset operator may leverage the capabilities of the mobile asset application server 14 as well as the capabilities of the mobile asset information linking device 38 and the mobile asset itself, to implement a number of operator-centric features and/or capabilities of the system. These operator-centric (operator oriented) features are directed to enabling efficiencies, conveniences and functionality related, for example, to the operation of the mobile asset 12 or of the performance of the operator's assigned tasks, such as performance/optimization/customization of the asset, education/assistance and training and/or providing task/workflow efficiency implementations, examples of which are described in greater detail below.

Operator Authorization

The wireless communication system may be utilized to facilitate mobile asset operator authorization and/or operator license/certification management. Under this arrangement, the mobile asset operator is required to accomplish a valid logon before a corresponding mobile asset 12, e.g., a forklift truck, may be operated. In order to successfully log onto the mobile asset 12, the logon operation may consider any number of factors, conditions and circumstances, examples of which are described in greater detail below.

Figure 8:
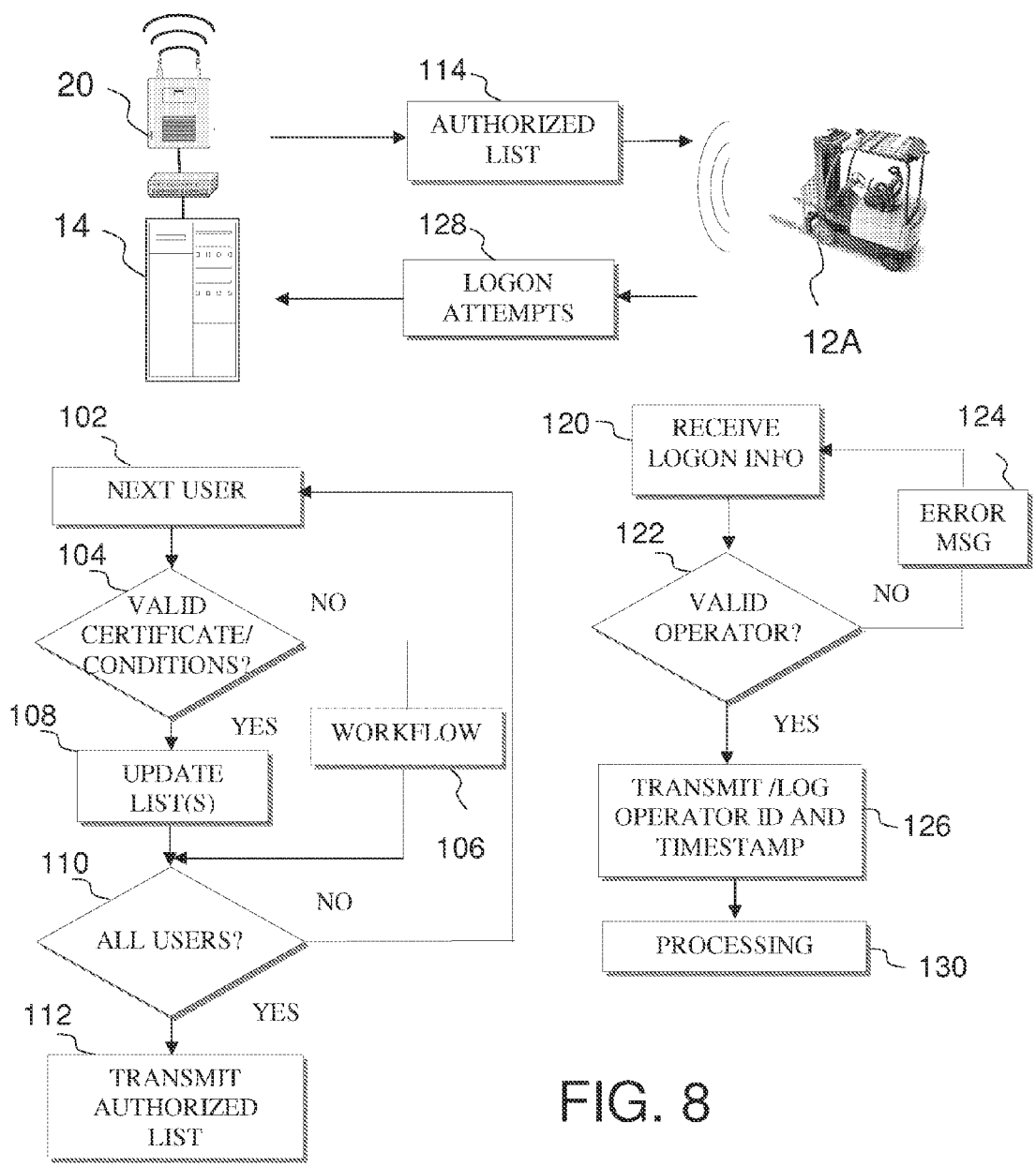
FIG. 8 is a diagram of an illustrative logon workflow.

Referring to FIG. 8, a block diagram illustrates an exemplary logon sequence, including corresponding pre-logon server activities. Before a user can log onto the mobile asset, e.g., a forklift truck 12A, the user must be included in a list of authorized users associated with that mobile asset (forklift truck 12A in the current example). The list of authorized users may be provided to the mobile asset 12A by the mobile asset application server 14, which builds, modifies, maintains or otherwise supports the authorized user lists. The mobile asset application server 14 may build or modify lists based upon a manually initiated process, or the mobile asset application server 14 may periodically build or modify authorized user lists, such as based upon the detection of predetermined events including changes in the status of operators, mobile assets, etc., based upon predetermined intervals, or based upon other conditions or circumstances. Examples of generating and distributing lists of authorized users to corresponding mobile assets 12 are described in greater detail herein.

To build a list of authorized users for the forklift truck 12A, the mobile asset application server 14 may process through a list of operators, such as may be maintained in a database, table or other suitable format stored within the data resource 16 associated with the mobile asset application server 14. For example, the application server 14 may consider each user from a list of users at 102, such as be examining the next user in a list of users. In order to be an authorized user for a given mobile asset 12, an operator may be required to meet certain predetermined requirements and/or conditions.

For example, the mobile asset application server 14 may consider factors such as the location of the mobile asset in determining whether a given user should be considered an authorized user for a corresponding mobile asset. As an example, a warehouse may include a bonded area that a given user may not have authorization to work in. If a corresponding mobile asset 12 is located in the bonded area, then the user may not be an authorized user. Alternatively, if the same mobile asset is outside the bonded area, then the user may be an authorized user. As another example, a user may not be authorized to drive a forklift truck on a loading dock. Accordingly, that user may be an authorized user, unless the corresponding mobile asset is on the loading dock. Alternatively, there may be multiple sites within an enterprise, and a user may only be authorized at a specific site location. Thus, a user that is authorized to operate a forklift truck at site 1 (see FIG. 2 for example) may not be authorized to operate the same forklift truck or same type of forklift truck at sites 2-n.

As still further examples, a user may be authorized to operate only specific types, classes, etc., of mobile assets 12. As an example, a user may be authorized to operate sit-down counter balanced forklift trucks, but not rider reach trucks. Accordingly, that user may be an authorized user only in lists associated with sit-down counter balanced forklift trucks. Still further, a user may be authorized only for specific mobile assets within a given type or class of mobile asset. As an example, a user may only be authorized to operate a specific forklift truck, which is identified by a specific unique identifier such as a serial number. Accordingly, that user would only be an authorized user for a list associated with the corresponding forklift truck having the associated serial number. Other factors, such as time, day, date, etc., may also be considered.

For example, the end of a work shift could automatically trigger a workflow that causes the mobile asset application server 14 to build a new list of authorized asset users for select (or all) mobile assets 12 having authorized user lists corresponding to users working the new shift. This updated list can then be automatically communicated to the corresponding mobile assets 12. As yet a further example, lists of authorized users may be adjusted based upon obtained/updated certifications, training, etc.

As shown, a check is performed at 104 to ascertain whether any license(s)/certificate(s) for that authorized user are required, and if required, whether they are still valid. In this regard, the mobile asset application server 14 may maintain a license/certification file that tracks licenses/certifications and their expiration dates (or range of valid dates) for each user. Accordingly, the server software may verify that each operator's licenses/certifications are valid (where applicable) by consulting the appropriate file(s). If a select user is an otherwise authorized user, but their license(s)/certification(s) have expired, a suitable workflow may be triggered at 106, such as by sending an e-mail notification or otherwise generating a notice of the license/certificate expiration. Further, the operator having the expired (or nonexistent) license or certification may be excluded from the updated list of authorized users. In this regard, the application server 14 may further monitor license/certificate expiration dates and trigger workflows such as for license/certificate renewal where the expiration date is within a predetermined range of dates so that appropriate actions can be taken to avoid such expirations.

The system may also check other parameters, events, conditions, etc. examples of which are described above. If the validity checks are satisfied at 104, the user is added to a list of users for the forklift truck 12A at 108. A check is made at 110 to determine whether all of the users have been checked. If there are more users to verify against their certifications, the process loops back to 102 to consider the next user. Instead of building a new list, the server software may alternatively alter existing authorized user lists, such as based upon changes to a user's licenses/certificates, operator characteristics, asset characteristics or other factors as noted more fully herein.

If all of the users have been considered, the appropriate updated list of authorized users is transmitted from the application server 14 to the forklift truck 12A at 112. For example, as schematically illustrated, an authorized list of users 114 is wirelessly transmitted from the application server 14 to the forklift truck 12A. The frequency at which the authorized operators list is updated will depend upon a number of factors of the specific implementation of the system. For example, the application server 14 may update the list maintained by the forklift truck 12A only when the previous list of authorized users changes. Thus, if a user is removed from the list of authorized users, that user will be removed from the list maintained by the forklift truck 12A the next time the application server 14 successfully updates the forklift truck 12A with the new list of authorized users at 112.

As an alternative, the wireless communications interface controller 50 of the mobile asset information linking device 38 of the forklift truck 12A may, from time to time, communicate with the mobile asset application server 14 to request updates of its list of approved asset operators. Still further, the mobile asset information linking device 38 may receive new authorized user lists that replace the existing authorized user list, or the mobile asset application server 14 may communicate only the changes to the corresponding authorized user list, in which case, the wireless communications interface controller 50 may modify its currently stored authorized user list based upon the data received from the mobile asset application server 14. Notably, in one exemplary implementation, the mobile asset 12A only stores a list of authorized users, despite the fact that the mobile asset application server 14 may have considered numerous factors in determining who those authorized users are for that mobile asset.

At some point after the forklift truck 12A has been programmed with a list of authorized users, an operator may be required to provide an operator identification. Accordingly, the operator may present logon information at 120, such as by entering a personal identification number (PIN) or other suitable logon information. The logon information can be entered, for example, using controls 42 (as shown in FIGS. 5A and 5B) that interact with the input/output control module 45. The logon information received by the input/output control module 45 is communicated to the interface controller 50, where it can be processed against the list of authorized users stored, for example, in the memory of the interface controller 50.

As an alternative, the operator may utilize a fob that interacts with the device reader 43 described with reference to FIG. 5A, or the operator may present a keyless entry fob at 120 that interacts with the fob reader 82 described with reference to FIG. 6 (if provided). Under this configuration, the fob reader 82 communicates the logon information to the interface controller 50, such as across the CAN bus or other mobile asset network system 68, via an input 64 coupled to the monitoring input/output module 48 of the mobile asset information linking device 38 or via other suitable input to the interface controller 50. Still further, other techniques, including biometric input technologies may be utilized to communicate logon information to the interface controller 50.

When a logon is received, the interface controller 50 verifies whether the presented logon information identifies an operator that is authorized to operate the forklift truck at 122. For example, the interface controller 50 may compare the received identification information, such as an operator ID, against the list of authorized user Operator IDs communicated to the mobile asset 12A by the application server 14. The interface controller 50 may further timestamp and record the attempted logon, regardless of whether the logon attempt was successful or failed. If the logon attempt failed, the interface controller 50 may provide an error message at 124, such as by writing a suitable message to the display 41. The failed logon attempt may also be recorded for purposes of data logging. At some convenient time, the forklift truck 12A communicates the operator identification information and timestamp for successful (and optionally for failed) logon attempts to the application server 14 at 126. For example, as schematically illustrated, a logon attempts file 128 is transmitted from the forklift truck 12A to the application server 14. Moreover, the system continues processing at 130, e.g. to implement other functions as set out more fully herein.

As noted above, the mobile asset application server 14 keeps track of each mobile asset user and the corresponding mobile assets that each user is authorized to operate. Authorization by the mobile asset application server 14 may be contingent upon a user having one or more valid (non-expired) license/certification, or based upon any number of other factors, including asset location, asset class/type, asset serial number, day, time, date and other factors. As yet a further example, mobile assets may be allocated to specific areas, locations, tasks or other criteria and users may be authorized to those mobile assets only if the user is also associated with the same criteria.

Further, positioning and other technologies may be utilized by the mobile asset application server 14 to determine the location of a mobile asset 12 so as to be able to evaluate the associated criteria as the application dictates. Thus, even for the same mobile asset 12, an operator may be authorized under a first set of conditions and not authorized under a different set of conditions. As an alternative to the above, decision logic, e.g., environmental conditions, location, time, etc., may be evaluated by the interface controller 50 or other processing logic of the forklift truck 12A or the information linking device 38, or the decision logic may be shared between the application server 14 and/or processing capabilities of the mobile asset 12.

If the license/certification for an asset operator expires, as is tracked by server software controlled by the mobile asset application server 14, then the mobile asset application server 14, at a suitable time, updates the list of authorized users corresponding to the affected mobile assets. This may automatically disable the asset operator's access to the affected mobile assets upon the detected expiration of the license/certificate and the associated updating of the authorized users at the corresponding mobile asset information linking device 38 of the corresponding mobile asset 12.

As noted above, the application server 14 may build authorization lists based upon operator ID, mobile asset ID/grouping and license/certification/training and other appropriate conditions. Once the application server 14 determines the list, only the corresponding operator IDs need to be wirelessly communicated to each corresponding mobile asset. Thus, at the mobile asset side, the only necessary parameter may be whether or not the operator ID is present in its local list of authorized users.

Once logged into the mobile asset 12, the asset operator may be able to operate the mobile asset 12 as necessary, or further procedures may be required, such as the completion of a checklist as described in greater detail herein. Even though an operator is successfully logged into a mobile asset 12 for operation, the wireless communications interface controller 50 may automatically log that operator off, e.g., where asset monitored activities have been idle for a specific period of time or where it has been determined that the operator exited the vehicle.

Numerous techniques may be used to detect operator exit. For example, the system can monitor traction, hydraulics and other mobile asset parameters and determine periods of inactivity. Additionally, sensors may be provided on the seat and/or other appropriate locations on the mobile asset that may be used to determine whether or not the operator is still on the mobile asset.

Moreover, the wireless communications interface controller 50 may be programmed, e.g., from the mobile asset interface, such as by using controls 42 or from the mobile asset application server 14, to allow a mobile asset 12 to be temporarily "locked" for a specific amount of time. For example, an asset operator may temporarily lock a mobile asset 12 to reserve that asset prior to the asset operator being ready for immediate asset usage. As another example, a mobile asset may be temporarily locked, e.g., by a supervisor or maintenance person to designate the asset as being unavailable.

Pre-Use Inspection Checklist

An inspection may be desired or required, such as before using a mobile asset 12 or at other appropriate times. Typically, the inspection process is performed by utilizing a paper-based checklist that directs the user to verify specific enumerated items on the list. Accordingly, the particular checklist may be different for each type of mobile is implemented.

In an illustrative implementation, after an operator successfully logs into a materials handling vehicle as described more fully herein, the operator is required to complete a checklist having a plurality of checklist items before the system decides whether to enable the materials handling vehicle for normal operation, e.g., by presenting a series of checklist items to the operator via the display 41 or 70, verbally or otherwise. The operator may respond to the checklist items and record the appropriate results via the controls 42 provided on the mobile asset information linking device 38. This approach to an electronic checklist may be utilized to ensure that mobile assets 12, such as materials handling vehicles, are inspected for proper operation, to identify need for repairs, enable maintenance alerts, etc. A mobile asset 12 may be locked out from operation or reduced in functionality of operation based upon a failure to complete the checklist. A mobile asset 12 may also be locked out from operation or reduced in functionality of operation as a result of one or more answers provided to the checklist. Moreover, a lockout may remain in force until a determination has been reached that the mobile asset is in proper operating condition.

For example, where the mobile asset comprises a forklift or other materials handling vehicle, the checklist may be presented to the asset operator in the form of questions, statements, status entries or other suitable formats that relate to pre-operation and operation of the forklift. Checklist items may also address issues related to the work environment, work processes, the operator, etc. As some illustrative examples, the operator may be asked to visually inspect a forklift for signs of structural damage, leaks, operation of components such as the horn, brakes, steering, hydraulic controls, etc.

Figure 9:
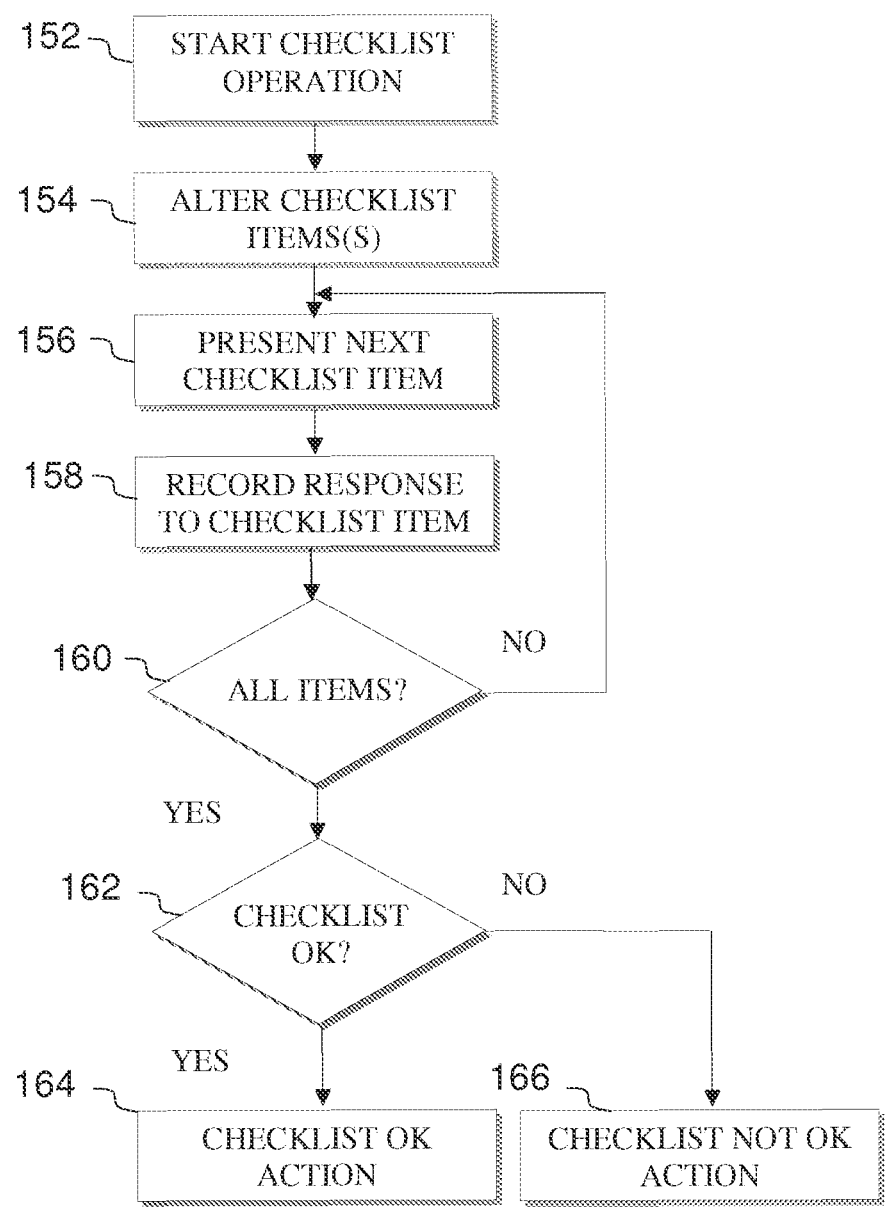
FIG. 9 is a flow chart of an exemplary checklist operation.

Referring to FIG. 9, in an exemplary implementation, a checklist operation is initiated at 152. The checklist operation may occur automatically, such as after the operator successfully logs onto the mobile asset 12. The checklist items may be generated at the mobile asset application server 14, in which case the checklist items are wirelessly communicated to the mobile asset information linking device 38 of the corresponding mobile asset 12 and are stored in the interface controller 50 or other suitable storage location within the information linking device 38 or otherwise within the electronics of the mobile asset 12.

Based upon a predetermined interval, the checklist items may be altered at 154. For example, the interface controller 50 may reorder the checklist items. Alternatively, the mobile asset application server 14 may reorder/alter the checklist items and wirelessly communicate the revised checklist items to the corresponding mobile asset 12. Thus, the operator may be presented with the checklist items that appear in a different order from time to time.

The checklist items can be reordered by randomly scrambling or otherwise changing their order or sequence. As another example, the checklist items may be altered by changing whether an "okay" condition is expressed in a positive or negative. For example, at one time the checklist item could ask: "Hydraulics working properly?" A next time the checklist item may ask: "Hydraulics leak?"

The response to each checklist item is recorded at 158. Along with the recorded response, a timestamp or other metadata may be recorded. A check is then made at 160 as to whether all of the checklist items have been presented to the operator. If not, the operation loops back to 156 to present the next checklist item to the operator. If all of the checklist items have been presented to the operator, a decision is made at 162 as to whether each of the checklist items has been handled appropriately. If the checklist responses are all okay, then an appropriate action is implemented at 164, such as clearing the checklist screen and/or enabling the corresponding mobile asset 12 for full operation if the mobile asset 12 is not already fully enabled. For example, if an evaluation of the results of the checklist for a forklift truck indicates that the forklift truck is suitable for operation, the truck may be enabled for normal operation and the results of the checklist may be wirelessly conveyed to a computer, e.g., the application server 14.

Alternatively, if a checklist item response indicates that a problem may exist, an action is implemented at 166. The precise action may depend upon the nature of the checklist item that indicates a problem. For example, if the checklist item relates to a "charged battery" and the operator answers "no" because the battery is less than fully charged, the mobile asset 12 may be enabled for full operation, and a workflow operation may be initiated to schedule an appropriate time at a battery changing/recharging station. As further illustrative examples, the mobile asset 12 may be disabled or otherwise reduced in functionality until the detected problem is corrected if warranted by the nature of the checklist responses. As noted above, at a suitable time, the checklist responses recorded at 158 are communicated to a computer, e.g., the mobile asset application server 14 for storage, automated generation of checklist reports, data analysis, etc.

In an exemplary implementation, a single checklist item may be reserved to always be presented last. For example, the checklist operation, regardless of the order of most of the items, may always conclude by asking whether the asset is in condition for operation with a yes/no answer required. Still further, the system may store questions and expected responses. If the response provided by the operator is not the expected response, the non-expected response is also stored.

As another illustrative example, the checklist may ask specific questions directed to ascertain whether or not the operator can demonstrate that they are suitably trained to operate that mobile asset 12. As an example, if the mobile asset comprises a forklift truck, a checklist item may ask "What is the maximum load capacity?" Such a checklist question would require that the operator know the answer, or at least be trained to locate and read a capacity plate or other designated marking provided on the mobile asset 12. Any other questions may be asked that require the operator to demonstrate knowledge of specific characteristics of the mobile asset 12 to be operated. Thus, as the operator works with different mobile asset types, the checklist items can be used to verify that the operator knows and understands the characteristics of each mobile asset 12, or knows where to look to find the appropriate information. In this regard, an incorrect answer may or may not affect the ability of the operator to utilize the mobile asset 12. For example, a wrong answer to a checklist question may be logged back to the mobile asset application server 14 to trigger an appropriate workflow, such as to initiate additional operator training. For example, an operator that misses checklist item answer(s) may require a refresher training activity that may be automatically or manually triggered based upon an appropriate workflow. The number of missed answers, the frequency of missed answers or other measure necessary to trigger a workflow and/or disable mobile asset operation may be based upon any number of factors as the specific application may dictate.

The checklist inspection may be required on a per operator/per-shift basis. Thus as an example, three different asset operators may log onto the same mobile asset 12 in one shift and each has to perform the checklist inspection. However, if an asset operator logs out of the mobile asset 12 and then logs back in within the same shift, the checklist may not be required. Alternatively, the checklist inspection may be configurable based upon a predetermined number of hours since the previous checklist was performed, or based upon other parameters, conditions, rules, etc.

As another exemplary implementation, the time it takes to complete the checklist may be determined. For example, the interface controller 50 on the mobile asset 12, or the mobile asset application server 14, may analyze at 162, the timestamp associated with each checklist response recorded at 158 and compare the timestamp with a corresponding "start of checklist" timestamp recorded at 152, which designates a time when the checklist operation began. From this analysis, an inference may be drawn as to whether the operator is taking an appropriate amount of time to complete the checklist, or whether the operator is taking an inappropriate amount of time to complete the checklist. Time periods of inactivity can also be recorded as well as intervals between answers to given checklist items.

As an example, an appropriate action may be performed if the asset operator completes the checklist (or a checklist item) in a manner that is determined inappropriate, e.g., by taking a predetermined action if it is determined that the checklist items were answered outside of a predetermined range of times (window) such as by completing the checklist either too quick or too slowly. For example, a time reference may be set to initialize a start time for the checklist operation and the time required to respond to the checklist items may be recorded. A determination may then be made as to whether the time required to respond to the checklist items is within a predetermined range of times. Correspondingly, a predetermined action may be taken if it is determined that the checklist items were answered outside of the predetermined range of times, e.g., a predefined suitable time window.

Thus, a mobile asset 12, which has been made fully operational based upon a user logon, may lockout if the checklist is not completed within a configurable designated time range. In this exemplary configuration, the mobile asset 12 may be fully operational after a successful operator login. But after a prescribed time, if the checklist has not been completed to satisfaction, then the mobile asset 12 may be disabled, such as by disabling the mobile asset 12 by sending the appropriate command to the vehicle power enable/conditioning 52. The mobile asset 12 may alternatively be reduced in functionality or other appropriate action may be taken. For example, the mobile asset 12 may continue to remain operational, however a buzzer, horn, light or other alarm may be implemented, such as via the monitoring input/output 48, until a supervisor clears the alarm. In addition, or as an alternative, the interface controller 50 may send a message to the mobile asset application server 14 to initiate a workflow, such as sending an e-mail or otherwise generating a notification that the checklist was not completed appropriately. As yet another example, the interface controller 50 on a materials handling vehicle may also communicate with vehicle components across the vehicle network system 68 to reduce functionality of the vehicle, e.g., limit or restrict travel speed, forks operation, etc.

Additionally, a predetermined time period may be provided for the operator to complete or otherwise redo the checklist if it is determined that the operator did not complete the checklist properly. Thus, a grace period or chance to redo the checklist may be presented to the operator to account for expected situations. For example, an operator who begins a checklist may be interrupted from completing the checklist. Under this arrangement, the operator is given a chance to redo the checklist, either by starting over, resuming checklist operation, or by addressing the matter in other manners deemed appropriate.

In an exemplary implementation, the results of the checklist are wirelessly transmitted to the mobile asset application server 14. Thus, the mobile asset application server 14 may further allow integration into existing workflows or the creation of new workflows to automatically send e-mail to designated personnel based upon responses to the checklist questions. Accordingly, appropriate maintenance and further inspection workflows, checklist reporting workflows and other checklist related tasks can be initiated, either automatically or manually, by the mobile asset application server 14.

According to an aspect of the present invention, the language that the checklist is displayed in may be varied to accommodate the language preference of the operator, e.g., based upon a language preference associated with the operator's logon identification. For example, the checklist items may be entered at the mobile asset application server 14 in a plurality of different languages. When an operator logs onto a mobile asset 12, based upon preferences associated with the operator ID, the appropriate language may be selected. As an example, the interface controller 50 on the asset may communicate the operator ID to the mobile asset application server 14. In response thereto, the mobile asset application server 14 may respond to the interface controller 50 with checklist items that are appropriate for the type of mobile asset to be operated, in a language understood/selected by the asset operator corresponding to the logged in operator ID. Any number of languages may thus be supported.

As an alternative, the interface controller 50 may prompt the user for a language preference before implementing the checklist operation. In this regard, messages may be stored within a memory device on the mobile asset in multiple languages. Still further, the mobile asset application server 14 may preload the checklist into a corresponding mobile asset 12 in two or more language choices, e.g., so that language determinations can be made at the mobile asset, such as based upon an operator logon identification.

Pre-Use Inspection Checklist Verification

As noted in greater detail herein, according to aspects of the present invention, the information linking device 38 may be integrated into the existing mobile asset network system 68. Accordingly, intelligent checklist monitoring may be implemented.

Figure 10:
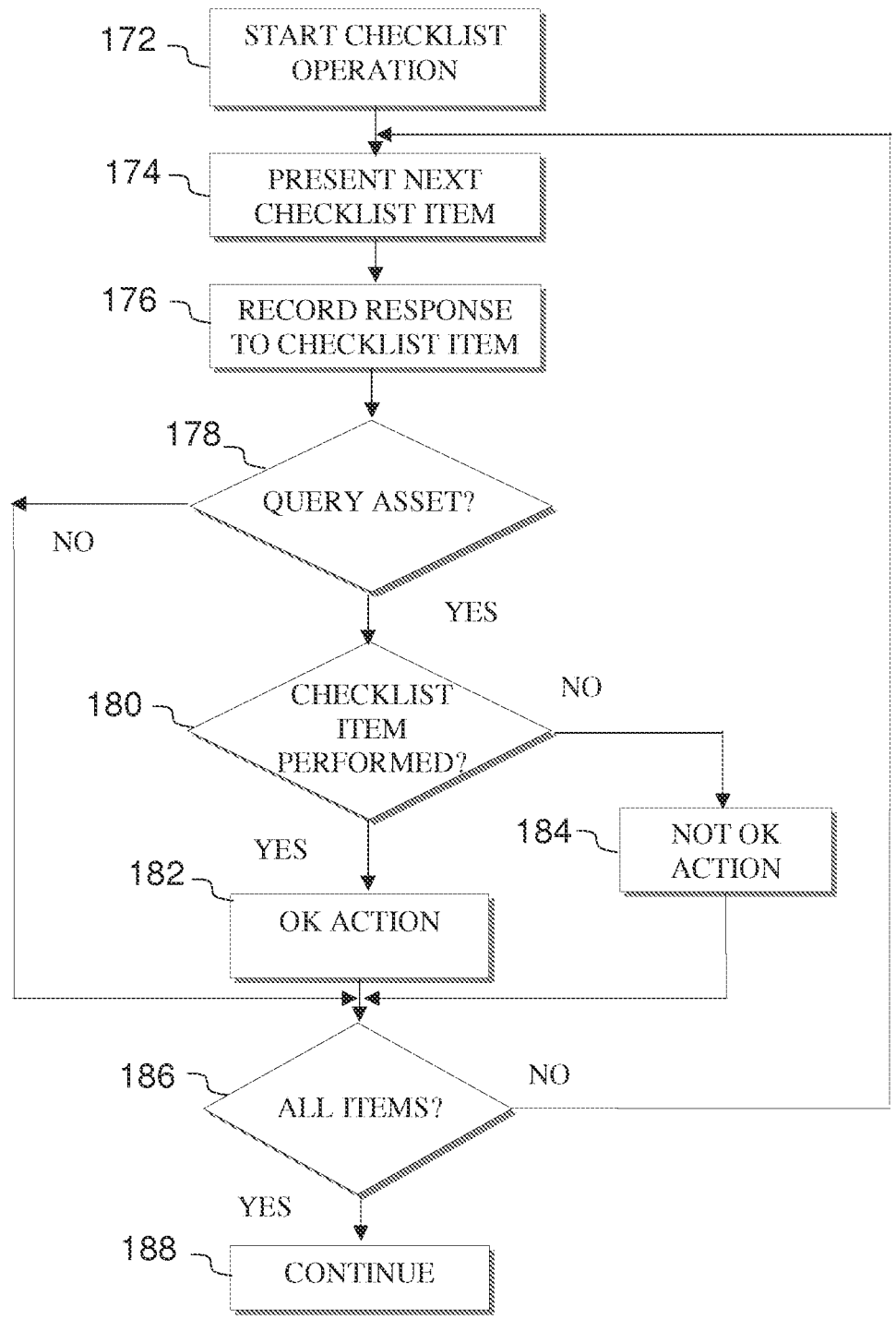
FIG. 10 is a flow chart of an exemplary checklist operation with asset derived checklist verification.

Referring to FIG. 10, a flow chart illustrates an exemplary approach to implementing an intelligent checklist operation. The checklist operation is initiated at 172 and a corresponding "start of checklist" timestamp may be generated. As noted above, the start of the checklist 172 may be triggered when an operator logs onto a mobile asset 12, such as a forklift truck, where that operator has not previously logged on to the same truck within the current work shift or other designated time frame. The checklist may optionally be altered, randomized, etc., as described above with reference to FIG. 9, and the checklist process begins. The next checklist item is presented to the operator at 174. For example, the checklist, which may be stored in the memory of the interface controller 50, may write the next checklist item to the display 41 (in the designated language) and await a response to the checklist item via the controls 42 of the corresponding input/output module 45.

The response to the checklist item is recorded at 176, along with optional timestamps and/or other metadata if desired. For at least one of the checklist items, an operator response verification is performed. For example, the mobile asset 12 may be queried to determine if the operator did, in fact, perform, check or otherwise properly evaluate the subject of the displayed checklist item at 178. Correspondingly, a decision is made at 180 as to whether the checklist item was actually performed. If it is determined that the checklist item was performed, then an optional checklist okay action may be implemented at 182, such as by providing an acknowledgement on the display 41, or by taking other actions, if necessary. Alternatively, an appropriate checklist action may be taken if it is determined that the checklist item was not performed at 184. Exemplary actions at 184 may comprise instructing the operator to complete the checklist item, sending an e-mail or other workflow indicating the failure to perform the checklist item, sounding an alarm, horn, lighting or flashing a light, logging the event, etc. A check is made at 186 as to whether all checklist items have been completed. If not, the operation loops back to present the next checklist item to the operator at 174. If the checklist has been completed, the process continues at 188 by performing tasks as described more fully herein, e.g., by performing the checklist evaluation and the subsequent processing described at 162, 164 and 166 with reference to FIG. 9.

As an example, in a typical materials handling vehicle checklist, e.g., a forklift checklist, an operator response verification for at least one of the checklist items may be performed by querying at least one component of the materials handling vehicle to determine whether the operator complied with a corresponding checklist item. Thus, the operator may be asked to verify that the steering is working properly. To answer this question properly, the operator may be required to actually operate the steering of the forklift. Under this arrangement, a processor provided within the interface controller 50 or otherwise integrated into the materials handling vehicle may query the Vehicle Control Module 74 or other appropriate module of the mobile asset control system, such as by sending a message to the VCM 74 across the CAN bus or other suitable mobile asset network system 68 to verify that the operator actually performed the test, e.g., operated the steering in a manner according to the requirements of the checklist item. Moreover, the processor may verify the accuracy of the operator answers and take the appropriate action as necessary. As another example, if the checklist item requires that the user test the hydraulics system, after receiving the operator response at 176, the processor can query the hydraulics control module 78 to determine whether the operator properly utilized the hydraulics in a manner appropriate to formulate a response to the corresponding checklist item.

Still further, verification that the checklist item was completed does not necessarily require detecting actual operation of the mobile asset 12. For example, if a checklist item is provided to verify hydraulic fluid levels or battery temperature, then an operator response verification may be performed by communicating with the corresponding component to electronically verify that the response to the select checklist item regarding the measurement or reading has been answered correctly. For example, the processor provided within the interface controller 50 or otherwise integrated into the materials handling vehicle may obtain readings from sensors, gauges and other vehicle resources to verify whether the operator's answer is appropriate. Moreover, nuisance codes, error conditions and other system diagnostic codes that are generated by the materials handling vehicle can be checked to substantiate the operator's responses to the checklist items. The above examples are merely illustrative. Thus any checklist item that can be verified by sensors, controllers and other components of the mobile asset 12 can be queried or otherwise analyzed to verify that the operator properly performed the checklist items.

As yet a further example, upon detecting that the operator did not properly perform the checklist item request, the processor provided within the interface controller 50 or otherwise integrated into the materials handling vehicle may send a message to the mobile asset application server 14 or other networked component, such as may be integrated into a site workflow to inform a manager, supervisor, etc., that the checklist is not being properly performed.

Accordingly, the operator may be asked in the checklist to operate the hydraulics, check the brakes, check the hour meter, battery charge, stop lights, fluid levels, etc. Because of the integration and communication of appropriate components into the mobile asset system, for example, as described with reference to FIG. 6, the mobile asset knows when each checklist question is being asked, and may be able to intelligently determine, depending, for example, upon the nature of the question and the sensing capability of the mobile asset 12, whether the operator actually performed the test, and may even be able to determine whether the answer reported by the operator is likely to be the correct answer.

In yet another illustrative and exemplary implementation, the processor provided within the interface controller 50 or otherwise integrated into the materials handling vehicle knows when each checklist question is being asked, and the nature of that question. As such, an action taken at 184 may be to refuse to acknowledge the operator-entered answer if the mobile asset 12 determines that the operator had not performed the test. For example, if the checklist item asks the operator to check the fork lifting capability of a mobile asset 12 such as a forklift truck, the system may refuse to acknowledge the operator-entered answer until the processor of the forklift truck senses that the forks have been lifted according to the checklist item test conditions. Thus, the checklist operation may utilize the operator response verification to refuse to advance to the next checklist item until the query response indicates that the checklist item has been performed.

Checklist Override Sequence

Additionally, a predetermined logon sequence may be implemented where the asset operator is not required to step through the checklist procedure. For example an override code may be established so that the mobile asset 12 becomes fully operational and functional upon logon only. Under this arrangement, the mobile asset 12 may have a predefined timeout where it is only operational for a predetermined period of time or, other appropriate terminating events may be triggered to limit the scope of the override. Additionally, vehicle functionality may be limited by the override, e.g., operation may be limited to steering and traction control, etc. The override may be provided, for example, where a time sensitive operation must be performed, such as moving the mobile asset 12.

Mobile Asset Monitoring

Each mobile asset 12 may record and timestamp key mobile asset related events, measurements and other parameters, which may be communicated from the corresponding mobile asset 12 to the mobile asset application server 14. As an illustrative example, the interface controller 50 of the mobile asset information linking device 38 may collect and log mobile asset-related data, such as power meter values, login usage, travel/speed parameters, hydraulics usage, oil quality measurements, load sensing, air temperature measurements, oil temperature and/or other key asset component temperature measurements, etc. Troubleshooting diagnostics, nuisance codes, location tracking information and other information ascertained by or otherwise associated with each mobile asset 12 may also be collected and temporarily stored by the interface controller 50. At an appropriate time when the transceiver 46 is in data communication with the mobile asset application server 14, the collected information may be appropriately communicated to a suitable storage location, such as a data resource 16 that may be maintained by the mobile asset application server 14.

The mobile asset application server 14 may use the collected data to perform any number of asset-related analyses. For example, the mobile asset application server 14 may monitor or otherwise analyze collected data from each mobile asset 12 to determine appropriate preventative maintenance schedules. This may allow, for example, advanced maintenance predictions to be implemented based on extreme, unusual duty cycles or other parameters. Further, collected data may be analyzed to reveal operation-related information. For example, by analyzing the number of pallets moved, total lift operations performed, distance traveled by each mobile asset 12, etc., changes may be implemented in workflow to maximize operational efficiencies. Numerous other examples are described in greater detail herein.

In some instances, wireless communication across the computing environment 10 may not be possible with a select mobile assets 12 due to that select mobile asset 12 being out of transmission/reception range with at least one access point 20, due to environmental interference, etc. As such, each mobile asset 12 includes sufficient memory, such as may be provided in the interface controller 50, to temporarily store the collected information that is generated during use of the mobile asset 12, and suitable provisions may made for the synchronization of the information collected by each mobile asset 12 and the corresponding mobile asset application server 14. Thus, the mobile asset communication server 14 does not require continuous communication with each mobile asset 12.

Impact Sensing

As noted above, depending upon the mobile asset 12, it may be desirable to implement customizable impact detection and appropriate post impact actions, such as lockout operations after the mobile asset stops. For example, with reference back to FIG. 6, the interface controller 50 may track minor impacts using appropriate impact sensors 60 and a corresponding monitoring input/output module 48.

Thus, if a predetermined event associated with the material handling vehicle comprises detecting an impact on a materials handling vehicle, the processor, e.g., provided by the interface controller 50 or otherwise integrated into the materials handling vehicle may be configured to respond to the detected impact by classifying the severity of the detected impact and by wirelessly communicating impact information to the server computer if it is determined that the detected impact exceeds at least one predetermined impact condition. The processor may also poll at least one vehicle component across the materials handling vehicle network system 68 to determine the extent of any damage that may have been caused by a detected impact that exceeds predetermined impact conditions. Moreover, information may be communicated to the server computer regarding impact damage where the information is obtained across the materials handling vehicle network system 68 from vehicle components. The obtained impact information may further be evaluated and an action may be performed at the materials handling vehicle based upon the evaluated impact information.

In an illustrative example, the interface controller 50 may compute or otherwise analyze the "severity" of impacts, such as to distinguish between minor impacts and major impacts. One strategy may be to lock out the mobile asset upon detecting a major impact and/or detecting a predetermined number of minor impacts.

Upon a detected impact that exceeds predetermined impact conditions, an alarm, such as a buzzer, horn or light may be activated, via the monitoring input/output 48 until a supervisor clears the alarm. A message may also be communicated to the mobile asset application server 14 so that an appropriate action may be taken. Further, as noted above, upon detecting an impact, the processor provided within the interface controller 50 or otherwise integrated into the materials handling vehicle may probe asset components via the CAN bus or other suitable mobile asset network system 68 to determine whether or not the vehicle is still operational. Under certain situations, the mobile asset may be shutdown, disabled or otherwise stopped. The mobile asset may also be able to distinguish a low threshold impact as noted above, in which case, the tracking of minor incidences may be simply logged/recorded without initiating an alarm. Still further, as noted above, the system may be configured to allow a predefined number of low threshold impacts within a predefined set of parameters. For example, if an operator within a single shift experiences a number of impacts having thresholds that exceed the low impact threshold, and that number of impacts exceeds a predetermined number of low impacts deemed acceptable, suitable responsive actions may be implemented.

Where a mobile asset 12 has suitable processing capabilities, such as in the interface controller 50, shock sensing may be intelligent such that the system learns what is normal and what is not normal for given applications or intended uses, e.g., to modify predetermined impact conditions used to evaluate detected impacts. For example, a forklift truck on a loading dock that drives into and out of trailers to pick up, drop off or otherwise move loads may experience a different level of ordinary and expected shocks relative to a comparable forklift truck that only operates on a level and relatively smooth concrete floor. The shock sensing system may also be trained to recognize the distinction between types of impacts such as via impact signatures. To distinguish impacts, the interface controller 50 or other suitable mobile asset processor may establish a signature for the detected impact, which is compared against sampled or otherwise determined impact data. A histogram can then be generated, or other processing tools can be utilized, so that the impact can be more accurately characterized. Such information may be communicated back to the applications server 14, which can use the information to create customized impact thresholds, signatures and other impact related information. The applications server 14 may also communicate impact threshold customization data to corresponding materials handling vehicles via the associated information linking device 38 to custom program the materials handling vehicle as noted more fully herein.

In an illustrative embodiment, an alarm is initiated on the mobile asset 12 upon detecting a sufficient impact condition. To deactivate the alarm, an acknowledgment and clear signal must be presented to the interface controller 50, for example by a manager or supervisor who must input the appropriate clear signal, such as by entering a suitable response using the controls 42 associated with the input/output control module 45. The operator may then operate the mobile asset 12, assuming that the mobile asset 12 is suitable for operation. In an alternative arrangement, the supervisor may be required to go back to the mobile asset application server 14 and clear the mobile asset 12 for continued operation, such as by clearing a lockout flag or other suitable information flag. Under this arrangement, the mobile asset application server 14 communicates with the interface controller 50 of the corresponding mobile asset via the asset's transceiver 46 to identify that a lockout condition has been suitably cleared at the mobile asset application server 14. Once the lockout condition is clear, the interface controller 50 re-enables the mobile asset for operation, such as via the vehicle power enable conditioning module 52. The supervisor may also annotate impact information, e.g., record metadata into a server database (from either the truck or the server) concerning the impact, such as by adding comments that describe the nature of the impact and/or other facts that may be relevant to the incident.

Proper Exit Detection

The mobile asset information linking device 38 and corresponding mobile asset application server 14 may further be used to track asset operator actions, which can be utilized to gain an insight into operator techniques and habits. For example if an operator exits a corresponding mobile asset 12 to which that operator is logged in, without performing a proper asset exit, such data can be recorded. As an example in a forklift truck, if the operator exits a parked truck without setting a parking brake, the forklift truck may automatically set the parking brake, such as by issuing appropriate commands implemented across the CAN bus or other mobile asset network system 68. Numerous other automated actions may also/alternatively be implemented. Further, the interface controller 50 can log the event and communicate such information to the corresponding mobile asset application server 14, which can generate reports, etc., indicating such improper exit.

Numerous techniques may be used to detect operator exit. For example, the system can monitor traction, hydraulics and other mobile asset parameters and determine periods of inactivity. Additionally, sensors may be provided on the seat and/or other appropriate locations on the mobile asset that may be used to determine whether or not the operator is still on the mobile asset.

On-Line Reference Materials And Other Data

Figure 11:
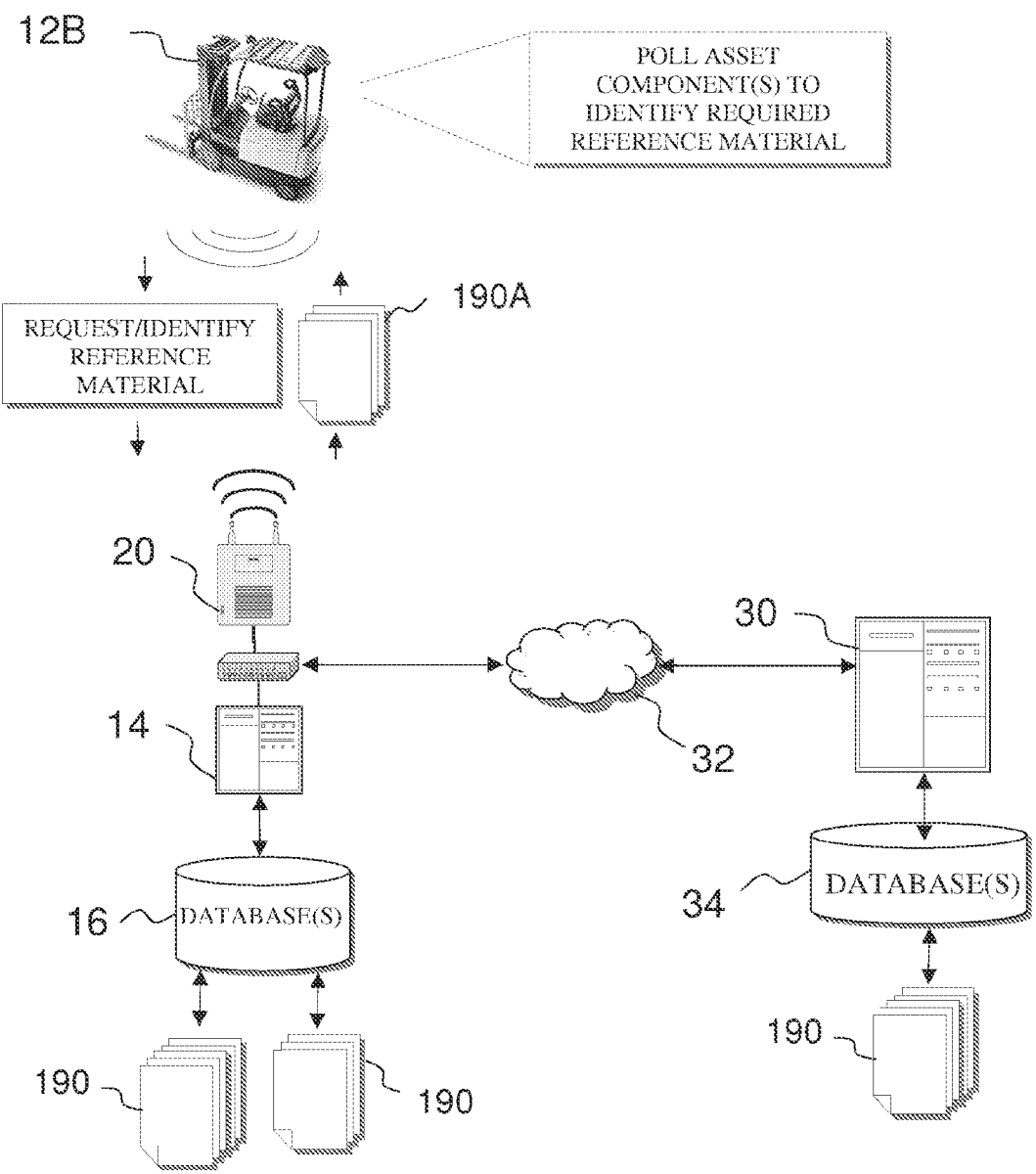
FIG. 11 is a block diagram illustrating the communication of reference material from an application server to a mobile asset.

With reference to FIG. 11, a mobile asset, illustrated as forklift truck 12B may further exploit the capabilities of its information linking device 38 to provide on-line manuals and other reference materials to a user of the mobile asset interface. These reference materials may be related to the forklift truck 12B, such as a materials handling vehicle operator manual, the manual to an accessory or peripheral component, a policy or guidelines followed at the site or any other suitable reference materials that may be of interest to the operator while at the asset interface.

In this regard, it may be inconvenient to store such materials in the memory of the mobile asset in the memory of the wireless communications interface controller 50 or other appropriate module. Thus, the mobile asset application server 14 may access the appropriate reference materials 190 from its database 16 and provide the requested materials to the user via the corresponding information linking device 38. The user at the asset interface e.g., a display and/or input output controls at the forklift truck 12B may not need the entirety of the reference, or the memory at the mobile asset may be insufficient to store the totality of a given reference. As such, the mobile asset application server 14 may communicate only a relevant portion 190A of a given reference 190 to a corresponding mobile asset user.

The mobile asset application server 14 may also control distribution of reference materials by utilizing the operator logon identification or other security measures to verify that the asset user is authorized to review the requested reference material. Such control may be used to prevent the distribution of sensitive business information to which the mobile asset applications server 14 may have access. As an example, an asset operator may be able to access training manuals, company policies, regulations, etc., but not productivity reports or other types of managerial information. However, a supervisor may log into the mobile asset application server 14 from a mobile asset interface and obtain such information.

As yet another example, the forklift truck 12B may be in need of servicing. The manufacturer may thus send a manufacturer repair representative to service the forklift truck 12. The manufacturer repair representative, while at the asset interface, may log onto the mobile asset application server 14 and request reference materials 190. Further, the manufacturer repair representative may require proprietary information, such as may be found in technical references and proprietary manufacturer documents. Under this arrangement, after presenting the appropriate identification or otherwise following appropriate security measures, the mobile asset application server 14 initiates a request across the network 32 to the manufacturers server 30 to obtain the required reference materials 190A from the manufacturer's database(s) 34. The sensitive or proprietary information may then be conveyed to the interface of the forklift truck.

In this regard, and in general, the various aspects of the present invention may implement any appropriate data encoding/decoding, encryption/decryption, secure transactions and other measures where warranted, e.g., by the nature of the data being communicated.

According to various aspects of the present invention, the system may further ensure that the most relevant and/or up-to-date reference information is provided to the user at the asset interface. For example, operation of a feature may be dependent upon a software version and/or whether a particular accessory or peripheral is also included on the forklift truck 12B. The mobile asset application server 14 may store this appropriate information, or the forklift truck 12B may provide such relevant information to the mobile asset application server 14 when requesting the appropriate reference material.

For example, assume that a repair representative is repairing a control handle of the forklift truck 12B. The interface controller 50 may recognize a request for reference material pertaining to the control handle and can communicate with other forklift truck system components across the CAN bus or other suitable vehicle network system 68 to identify software version numbers and/or other relevant features of the control handle, which are communicated to the mobile asset application server 14 to ensure that the correct reference material is provided.

Interactive Training

The mobile asset 12 can also leverage the capabilities of the mobile asset application server 14 and a corresponding mobile asset information linking device 38 installed on or otherwise integrated with a mobile asset 12 to provide adaptive or interactive operator training. In this regard, the mobile asset 12 can monitor and log the manner in which an operator uses its controls and features, and when appropriate, suggest new and/or appropriate ways to perform certain tasks.

The mobile asset 12 can also detect when an operator is attempting to perform an illegal or an impermissible operation, such as attempting to use two conflicting features simultaneously, attempting to operate a load handling feature when the seat is in an inappropriate position, attempting an operation with a select feature while traveling at a wrong speed range, etc. Under this arrangement, the error can be pointed out, and possible solutions or alternatives may be provided, for example, via the display 41, 50, or otherwise. In this regard, the mobile asset information linking device 38 may be used to log the activity of the operator, to send the activity information to the mobile asset application server 14, to request training materials such as reference manuals, etc., from the mobile asset application server 14 as the specific circumstances require.

The mobile asset 12 may also provide a visual and/or audible indication that tells the operator when the asset is being used inappropriately, for example, by flashing a light, sounding a horn or buzzer, etc. As an alternative, a visual and/or audible signal may be provided to indicate that the mobile asset 12 is being used in an appropriate (or in an optimized) manner.

Driver Coaching, Training And Education

The asset display may provide a "tip of the day" or "did you know" style of messaging at appropriate times to promote training and interaction with the operator. For example, if the mobile asset information linking device 38 recognizes that an operator utilizes a specific sequence of commands or controls to implement certain functions, such as by communicating with vehicle system components across a CAN bus or other suitable mobile asset network system 68, the system may suggest additional operational efficiencies or alternative ways of performing a given task. Also, if an operator seldom or never uses specific mobile asset features or functions, the system may suggest those features or functions to the operator. In order to provide suggestions, the mobile asset information linking device 38 may consult locally stored information, or relevant information can be exchanged with the mobile asset application server 14 to obtain appropriate training information. Thus, the user is dynamically trained while at the interface point of the mobile asset 12.

Additionally, off-line training can be implemented. For example, the mobile asset information linking device 38 can present the asset operator with a series of instructions for mobile asset operation, such as during periods of inactivity. Further, the mobile asset information linking device 38 may be able to interact with the mobile asset to demonstrate an implementation of instructions.

For example, based upon logged use of vehicle features by the operator, the system may implement training of a particular vehicle feature. Based upon interaction between the processor provided within the interface controller 50 or otherwise integrated into the materials handling vehicle and at least one component across a materials handling vehicle network system 68, the vehicle may automatically demonstrate the feature being trained on, to the operator as the operator is in a work operative position within the vehicle. The system may also test the operator with regard to a feature being taught by monitoring communications across the materials handling vehicle network system 68 to log operator use relevant to the feature being taught. As such, the system may ensure that the operator is performing the function properly by checking that the component is responding appropriately relative to the feature being taught.

Thus, by integrating training materials provided by the mobile asset application server 14, the mobile asset information linking device 38 can interact with asset system components via the CAN bus or other appropriate mobile asset network system 68 to control asset features to implement the demonstrations. The asset operator may then be presented with an opportunity to test the skills just taught by implementing the control sequence corresponding to the provided series of instructions. The mobile asset information linking device 38 can monitor the actions implemented by the asset operator and suggest corrections and other actions so the operator successfully master skills related to the mobile asset operation by providing training instructions, which may be supplemented by appropriate links to a corresponding operator and/or training manual that can be displayed on the mobile asset display.

Customized Work Environment

According to various aspects of the present invention, a customized mobile asset work environment may also be realized. In this regard, the processor provided within the interface controller 50 or otherwise integrated into the materials handling vehicle may implement at least one customization function on the materials handling vehicle based upon the received logon information, such as by wirelessly communicating information between the application server 14 and the materials handling vehicle via the transceiver 46 and interacting with at least one component of the materials handling vehicle across the materials handling vehicle network system 68. For example, at least one feature of the materials handling vehicle may be reconfigured according to the retrieved customization parameters. A customization function may comprise a customizing operation of a component of the materials handling vehicle according to any number and/or type of operator-defined preferences.

For example, an operator can set the seat position, program features or other suitable capabilities, and these "settings" may be saved and associated with the operator log on identification, e.g., in a suitable "profile" that can be stored in the local memory of the interface controller 50 and/or on the mobile asset application server 14. Accordingly, when the operator logs into the mobile asset (or similar mobile asset), the customized settings are automatically recalled and implemented.

As another illustrative example, an operator may be able to configure the display to show or hide certain layers of details. Accordingly, one operator may like a clean and sparse dashboard display, while another operator may want to see more details in the display, or to see superfluous information, such as personal pictures, etc. New operators or trainees may also have training profiles where the system may periodically display the time it takes the operators to perform certain tasks, instructions, reminders, etc. The system may also provide statistics and/or other feedback on operator efficiency and/or improvements so that new operators can actively monitor whether they understand their assigned tasks, the usage of the mobile asset 12 and to confirm that they are developing their skill at an appropriate target rate.

As yet another example, operator messages may be programmed in a number of languages. For instance, the information linking device 38 may be able to wirelessly download operator messages in any number of language formats. The downloaded operator messages can then be reprogrammed into flash memory, etc. As such, as new menus, features, operator messages and/or languages become available over time, such new features can be automatically integrated into the information linking device 38. As an example, an operator's profile can be used to select an appropriate language for the display of commands, operator messages, etc. Alternatively, the operator may be prompted to select a desired language format, such as at a login or during an initialization process.

Thus for example, the language of the display can be reconfigured, the seat height, seat angle, seat position, control macros, performance characteristics and other mobile asset-related parameters can be automatically configured upon a single login. Moreover, personalized greetings, relevant messages and other information of a personalized nature, such as a personalized display, may be presented to the operator based upon a known login identification and corresponding profile.

According to aspects of the present invention, the system may obtain customized settings selected by an operator for at least one of a specific materials handling vehicle or for a specific type of materials handling vehicle, e.g., where the location has a fleet of materials handling vehicles. The customized settings are stored at the applications server 14 such that when the operator logs onto a materials handling vehicle for which preferences have been saved, at least one of the specific materials handling vehicle or the materials handling vehicle type that the operator is logged into is identified and the operator's preferences are obtained for the associated materials handling vehicle. Moreover, as noted above, communications across the materials handling vehicle network bus may be performed to configure the materials handling vehicle for operation according to the operator's preferences received from the applications server 14.

Repetitive Task Automation/Assistance

The mobile asset 12 may leverage its sensing and wireless communications capabilities to assist the operator in repetitive tasks. For example, the mobile asset information linking device 38 may assist the operator in completing a pre-use checklist by automatically driving the checklist questioning and recording/wirelessly transmitting the checklist responses.

As another illustrative example, a "macro learn" function can be implemented. In this arrangement, an asset operator may learn a trick associated with the mobile asset 12, such as a maneuver, control sequence, etc., and save that trick as a macro. This macro can then be shared via the mobile asset application server 14 with other mobile assets/asset operators, and may be archived to the mobile asset application server 14 for storage and for retaining a backup copy. Each time the operator initiates a stored macro, the processor provided within the interface controller 50 or otherwise integrated into the mobile asset interacts with the mobile asset system electronics, and/or the mobile asset application server 14 to execute the steps recorded as part of the macro event. This enables a wide range of technique transfer and promotes the exchange of knowledge.

Environmental Timers

In certain environments, restrictions on asset operators may be imposed, such as how long an operator may be in an extreme environment. The mobile asset information linking device 38 may detect such circumstances and then begin a timer so that the operator does not have to manually keep track of such time. The mobile asset may either demonstrate compliance by affecting remedial action, such as exiting the environment, or provide an indication to the operator that the time has expired, such as by sounding a horn, alarm or providing another indicator, such as via the monitoring input/output 48 and an appropriately controlled output device. Moreover, reports may be generated using the data gathered and stored by the mobile asset application server 14 corresponding to environmental timer event data collected by a corresponding mobile asset information linking device 38, which was subsequently communicated to the mobile asset application server 14.

Performance Tuning

The integration of mobile asset information linking device components into the control system of a corresponding mobile asset 12 may be used to implement "performance tuning" of the mobile asset 12. A performance rating may be received from the applications server 14 for the operator logged onto the corresponding materials handling vehicle. In response thereto, instructions are communicated from the processor provided within the interface controller 50 or otherwise integrated into the materials handling vehicle to at least one vehicle component across the materials handling vehicle network bus to selectively limit, disable or configure the performance of at least one feature based upon the performance rating associated with that operator.

As an example, assume that the mobile asset 12 comprises a materials handling vehicle. As noted above, the mobile asset application server 14 stores a list of authorized operators, which may also include a license/certification management aspect that makes sure that each operator who is otherwise authorized to operate the mobile asset maintains a valid and up to date operator's license. According to this aspect of the present invention, performance data is also associated with each authorized user.

Figure 12:
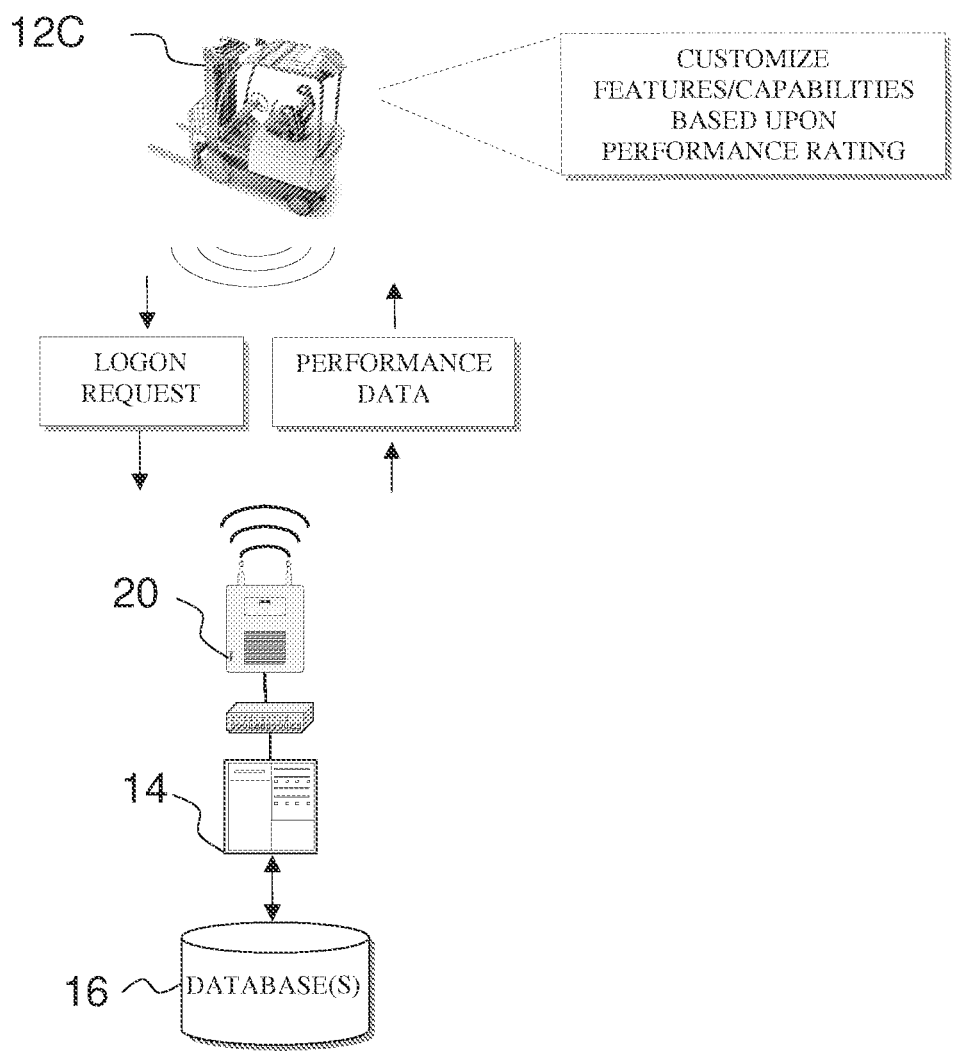
FIG. 12 is a block diagram for implementing mobile asset performance tuning.

Referring to FIG. 12, in an exemplary implementation, "performance tuning" may be utilized as a way to rank authorized and licensed/certified operators according to experience and skill, and to adjust the operating characteristics of the mobile asset 12 accordingly. For example, operator performance ratings such as P1, P2 and P3 can be used to differentiate authorized operators, where P3 may correspond to a beginner, P2 may correspond to an intermediate skilled operator and P1 may correspond to an advanced skilled operator.

As an authorized operator's performance rating is improved, the mobile asset may unlock or otherwise enable advanced features, modify features and mobile asset capabilities and/or otherwise adjust one or more operating characteristics to match the capability of the operator. Correspondingly, the mobile asset 12 may disable advanced features, limit capabilities, alter performance capabilities, etc., for relatively lower ranked/skilled operators. For example, an experienced P1 operator may be able to drive a mobile asset 12 at higher rates of speed, perform certain functions simultaneously, etc., relative to a corresponding novice P3 operator. Any other number of ranking systems may be provided to implement such performance tuning.

Operator rating may be based upon a number of factors, including for example the currently held operator licenses, certifications, number of years of experience, etc. Further, operator rating may be based upon actual monitored measures of operator capabilities. As noted above, the mobile asset information linking device 38 may be capable of monitoring and logging aspects of mobile asset operation, and to wirelessly transmit that information to the network, for example, to the mobile asset application server 14. As such, the metrics used to evaluate and determine operator skill may be based upon actual event and other data collected by a corresponding mobile asset information linking device 38. For example, if an operator trips the impact sensors 60 a predetermined number of times, or when traveling at certain speeds, the corresponding performance rating may be adjusted. This example was meant by way of illustration and not by way of limitation of the many approaches to integrate actual operator performance/usage/capability information into a determination of performance ranking.

Geofencing And Position Dependent Operation

The integration of mobile asset information linking device components into the control system of a corresponding mobile asset 12 further allows for asset position dependent operation. An illustrative example of such position dependent operation is the implementation of "geofencing", which may be used to create virtual "fences" that restrict, direct, guide or otherwise affect navigation of the mobile assets 12.

As an example, a device may be provided on a materials handling vehicle that is utilized to determine a position of the materials handling vehicle. The processor provided within the interface controller 50 or otherwise integrated into the materials handling vehicle is configured to implement at least one function on the materials handling vehicle by wirelessly communicating obtained position related information between the applications server 14 and the materials handling vehicle via the transceiver 46 such that the position of the materials handling vehicle is determined. Moreover, the processor interacts with at least one component of the materials handling vehicle to perform a predetermined action in response to receiving a command from the applications server 14 based upon the determined position of the materials handling vehicle. The action may comprise, for example, at least one of an avoidance maneuver or a speed reduction in response to the materials handling vehicle. Moreover, the action may be dynamically selected based upon at least one current operating condition of the materials handling vehicle.

Figure 13:
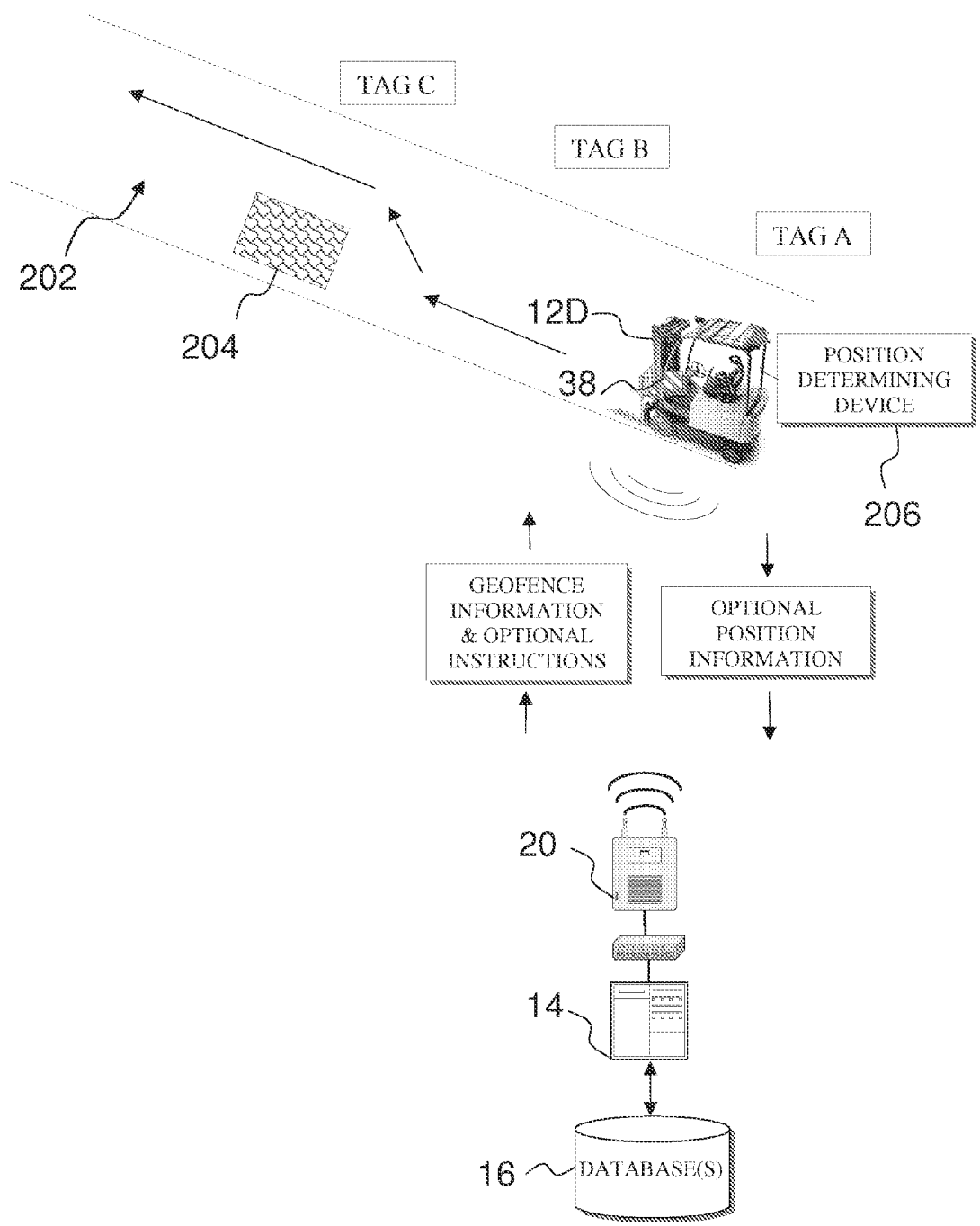
FIG. 13 is a block diagram for implementing geofencing.

Referring to FIG. 13, a geofence capability is illustrated. Assume that a forklift truck 12D is traveling down a lane 202. At some previous point in time, a geofence 204 is set up by the mobile asset application server 14 to quarantine an area of the lane 202. The mobile asset application server 14 communicates information concerning the geofence 204 to the corresponding mobile asset information linking device 38 on the forklift truck 12D. The interface controller 50 may thus interact with other forklift systems across a CAN bus or other suitable mobile asset network system 68 such that the forklift truck 12D either automatically implements an evasive maneuver, manually instructs the operator to take an evasive maneuver or takes other appropriate action to avoid the area of the geofence 204.

For example, the forklift truck 12D may include a position determining device or other capability 206 so as to be able to determine the mobile asset position relative to the geofence 204. The position information may be communicated to the mobile asset application server 14, depending upon the particular implementation, such as to implement forklift tracking, to trigger the communication of geofence information and/or for other suitable applications. Thus, in furthering this example, workers may be in the vicinity of the geofence 204. As such, the application server 14 may identify the presence of the workers and may communicate such information to forklift truck 12D including instructions to slow down while proximate to the geofence 204 etc.

As another illustrative example, assume that moisture is identified on the floor of a site, or that a spill, debris or undesirable materials are located in a path of travel of mobile assets. Appropriate information regarding the positioning of the spill is communicated to the mobile asset application server 14, which creates a geofence 204 around that designated area. This geofence 204 is communicated from the mobile asset application server 14 to one or more of the mobile assets 12, e.g., via the mobile asset information linking device 38 on each mobile asset 12. Under this arrangement, as a forklift truck 12D advances towards, or otherwise approaches the area surrounded by the geofence 204, the forklift truck 12D may warn the operator by sounding a horn. Moreover, the forklift truck 12D may implement an evasive maneuver or otherwise perform a remediation action, such as by automatically steering around the area and/or avoiding the area that has been geofenced, or by reducing the speed of the forklift truck 12D, or performing other appropriate actions.

Moreover the particular corrective action may be intelligently selected, based upon the operating characteristics of the forklift truck 12D. For example, an appropriate response to a geofence 204 such as a wet floor may be based upon the speed of the forklift truck 12D, the load carried by the forklift truck 12D, whether the forklift truck 12D is traveling forwards or backwards, the skill (performance rating) of the operator, etc. Thus for example, a slow traveling forklift with no load may react differently than a forklift carrying a significant load on its forks. In other exemplary conditions, strict adherence to avoiding the geofence 204 may be implemented, as will be described in another example below.

Additionally, certain workflows may be automatically implemented. For example, if a spill or other undesired environmental condition is detected by an asset operator, or where the mobile asset application server 14 otherwise creates a geofence 204, an e-mail message or other workflow process may be initiated to the appropriate personnel such as the maintenance department to perform cleanup operations. After correcting the condition that triggered the creation of the geofence 204, the mobile asset application server 14 can "take down" the geofence 204, such as by sending an appropriate message to the relevant mobile assets 12 at an appropriate time.

A geofence 204 may also be used to limit or prohibit a mobile asset 12 from a specific area. For example in a bonded warehouse, if an operator is not appropriately authorized to drive into a certain region, a geofence 204 may be created to prevent the corresponding mobile asset 12 from traveling into the unauthorized regions. In this example, the type of mobile asset and/or the identification of the particular operator may be utilized as factors to consider whether the geofence 204 affects the particular mobile asset or not. Similarly, geofences 204 may be located in areas where asset operation should be avoided. For example, a first geofence 204 may prohibit reach trucks from entering a loading dock area, but allow certain forklift trucks to travel to and from the loading docks unhindered. However, a second geofence 204 may be positioned on the edges of a loading dock or on an area that has an unsuitable surface to prohibit the forklift trucks from entering such areas. Again, factors such as the load carried by the mobile asset, the speed of the mobile asset, asset type, operator ID, etc., may be used in determining the manner in which geofencing is implemented with respect to a particular mobile asset 12.

The effectiveness of position dependent asset operation, for example, the creation of geofences 204, may be contingent upon the accuracy of asset positioning in the network system. In a first example, a mobile asset 12 need not be equipped with a separate position determining device 206 per se. Rather, a particular site may have a plurality of wireless access points 20. Under this arrangement, the mobile asset application server 14 may be able to determine which particular wireless access point 20 it is communicating with, e.g., by recognizing a mac address or other unique identifier of each access point 20. Further, the mobile asset application server 14 may know the location of each access point 20.

Thus, triangulation techniques may be used to identify asset position based upon a measure of the relative signal strength of a signal transmitted by a select mobile asset 12 received at the various access points 20. Alternatively, other positioning technologies may be utilized. For example, the position determining device may be implemented as a global positioning system (GPS). For example, a GPS system may be implemented as one of the optional controllers/modules/devices 80 described with reference to FIG. 6.

Still further, unique tags, e.g., TAG A, TAG B and TAG C as shown in FIG. 13, may be distributed about a work area. Under this arrangement, the position determining device 206 may comprise a suitable tag reader. By knowing the most recent tag that was sensed/read, and by knowing the locations of the tags, a positioning system can infer the mobile asset position. Thus, in the above example, the geofence 204 may be associated with a position corresponding to TAG C and an evasive maneuver can be implemented by detecting that the forklift 12D is somewhere between TAG B and TAG C.

As an example, Radio Frequency Identification (RFID) tags may be used to detect position. In this arrangement, RFID tags may be strategically located about the corresponding site, where each tag is associated with a known position. A suitable RFID detector implemented as the position determining device 206, e.g., one of the optional controllers/modules/devices 80 described with reference to FIG. 6, may be used to read each encountered RFID tag. The position information from reading tags may be determined locally at the asset by the interface controller 50, or tag data may be communicated to the mobile asset application server 14 for position determination. The accuracy of such a system can be adjusted by varying the number of tags and the spacing between tags at the site. Still further, perimeter sensors and other similar technologies may by utilized in conjunction with a suitable asset mounted reader to ascertain position information. Any number of other arrangements may alternatively be used, so long as asset position is determined to within the range of tolerance dictated by the specific application.

According to various aspects of the present invention, information related to vehicle position may be maintained over a predetermined window of time and data may be logged during vehicle operation over the window of time by obtaining information from at least one vehicle component across the materials handling vehicle network bus. Upon detecting a triggering event, an event report may be wirelessly communicated to the applications server 14 to preserve the information recorded over the window, such as to capture position information over a period may include at least one of just before the event, just after the event, or both before and after the event.

Feature Updates/Upgrades

According to further aspects of the present invention, a predetermined event may be detected that is associated with a request for a software version change of at least one mobile asset component, such as a materials handling vehicle component that is coupled to a corresponding vehicle network bus. Thus, a software version change may be implemented by wirelessly receiving a software change from the applications server 14 that is directed to a selected vehicle component connected to the materials handling vehicle network bus and reprogramming the selected vehicle component based upon the received software version by communicating with the materials handling vehicle component across the network bus.

Thus, for example, in implementations where the wireless information linking device 38 is coupled to the CAN bus or other suitable vehicle network system 68, advanced features can be implemented. The transceiver 46 can serve as a gateway to the corresponding mobile asset 12 so that any software upgradeable/reprogrammable component of the asset can wirelessly receive software modifications and other reprogramming instructions. For example, updates to a vehicle control program or other software controlled mobile asset feature can be wirelessly transmitted to the asset via the mobile asset information linking device 38. The processor provided within the interface controller 50 or otherwise integrated into the mobile asset may then interact with the appropriate system components via the CAN bus or other suitable network system 68 to implement the software update, e.g., an upgrade, revision, patch or other modification. If the asset is in operation at the time of receiving the software, the associated reprogramming instructions may be temporarily stored, for example, by the interface controller 50, until a time that is appropriate for the reprogramming activity.

Figure 14:
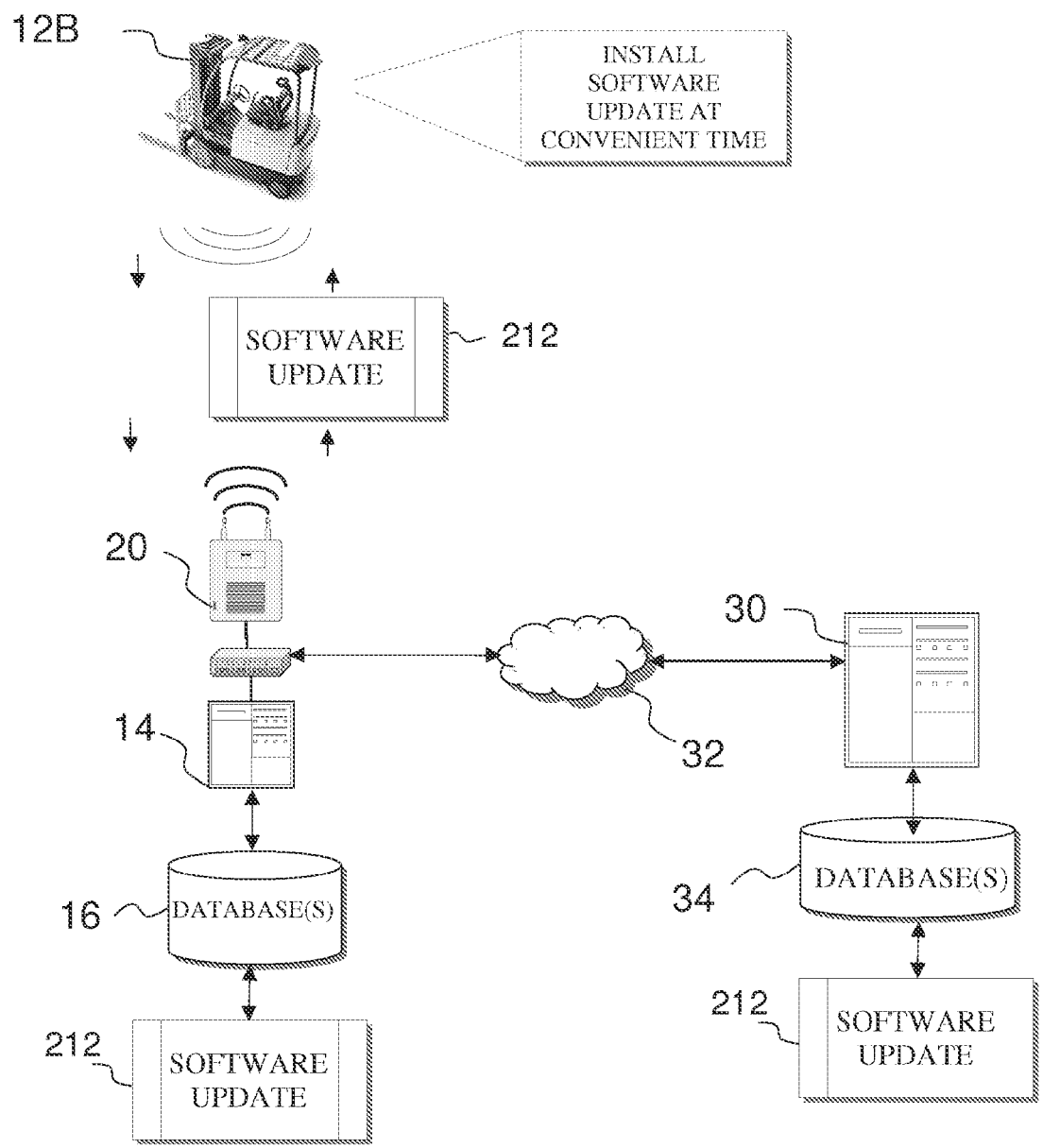
FIG. 14 is a block diagram for receiving wireless software upgrades.

Referring to FIG. 14, a software update 212 may be transmitted to a mobile asset 12 from the mobile asset application server 14, which may load the software update 212 onto the network from a portable computer media. Alternatively, the software update 212 may originate from a remote server 30, e.g., a manufacturer may communicate the software upgrade to the mobile asset application server 14 across the network 32.

Additionally, certain features of a mobile asset 112, e.g., a materials handling vehicle, may be controlled, configured or otherwise communicate with the processing devices associated with the corresponding enterprise 26 or inter-enterprise remote server 30. This may enable, for example, a manufacturer of a component, peripheral, etc., to configure, reboot, adjust, modify or otherwise control or interact in real time (or near real time) with the associated component, peripheral, or other aspect of a corresponding mobile asset 12 across the wireless network via a corresponding mobile asset information linking device 38.

Software Upgradeable Mobile Asset Information Linking Device

Figure 15:
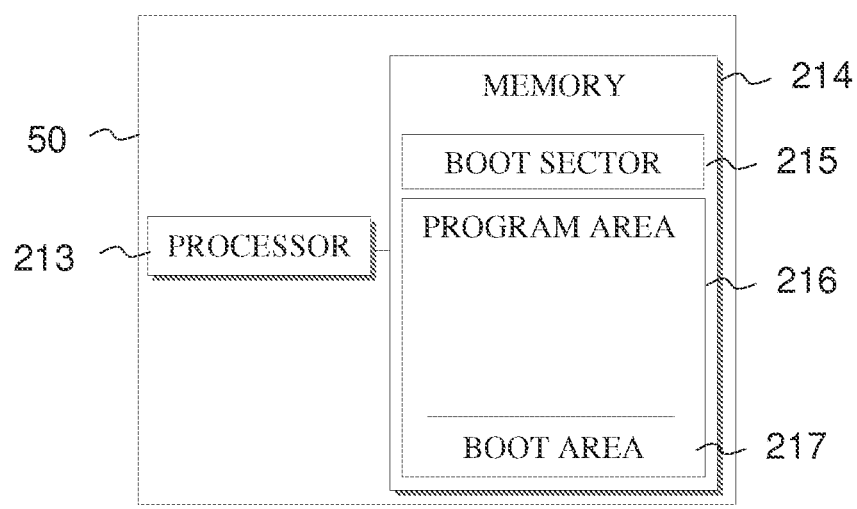
FIG. 15 is a block diagram of a processor and memory of a wireless communications interface controller.

Referring to FIG. 15, as noted in greater detail herein, the wireless communications interface controller 50 includes a processor 213 in communication with memory 214. The memory 214 may include a boot sector 215 for flash reprogramming of functions and capabilities associated with the mobile asset information linking device 38 and for reboot ability. The memory 214 of the interface controller 50 may also include a separate application area 216 that also has a boot area 217.

According to aspects of the present invention, when performing flash programming, the application area 216 may be erased. Under this arrangement, the boot sector 215 is used to update the programming in the application area 216 with a software update 212. The software in the applications area 216 may further be used to erase the boot sector 215 so as to replace the boot with updated information, such as an updated boot loader. For example, the software update 212 may include a boot area 217 in its code so that the system can replace the code in the boot sector 215 with a new boot loader provided in the new boot code 217 that is included with a corresponding software update 212. As such, upgrades and capabilities are not limited to the particular implementation of the boot area of the interface controller 50 at any given time.

Intelligent Diagnostic Checklist

If a mobile asset 12 experiences an error during a work shift or other designated working period, an operator may utilize the mobile asset information linking device 38 to invoke an inspection checklist that may be able to identify the cause of the failure. In this regard, the mobile asset information linking device 38 can serve as an interface and interact with both mobile asset components via the CAN bus or other appropriate mobile asset network system 68, and with enterprise servers as well as third party servers, such as manufacturer servers across one or more network connections. As such, intelligent checklist diagnostics as well as event driven diagnostics can be implemented based upon information derived locally at the asset as well as based upon information communicated across the wireless network.

Task Integration

The wireless communication capabilities of the various aspects of the present invention may further allow fleet management to tie into task related activities, such as by integrating into Warehouse Management Software (WMS). In this regard, the wireless system may serve as a conduit between the WMS application and the operator so as to facilitate directed picking, providing routes to drivers, providing instructions for exception handling, such as where a SKU is not at an anticipated location or perform functions such as directing the operator in other WMS related regards. Moreover, the mobile asset application server 14 can blend mobile asset related data into the WMS data for integration of product and asset monitoring. Integration may be further enhanced through integration of the application server 14 with other enterprise applications.

As an example, if a WMS system informs an asset operator where to pick up and place a load of items, the information linking device 38 and corresponding input devices such as a tag reader etc., can be used to record and/or verify the locations of where the operator picked up and placed the load. Appropriate data can be sent to the WMS system, e.g., via the mobile asset application server 14 to ensure that tasks are being performed in accordance with the WMS directives. Further, the information linking device 38 may be able to understand the WMS instructions to the asset operator. Accordingly, the information linking device 38 may be able to provide feedback to the asset operator to indicate that the proper loads are being handled and that load movements and other activities are being performed correctly. Also, any number of appropriate workflows may be triggered based upon the usage data logged by the information linking device 38.

Paging

The mobile asset information linking device 38 may further be used to receive targeted messages to specific mobile assets 12. For example, the mobile asset application server 14 may be used to forward or otherwise originate pages, instant messages or other communications to specific mobile assets and/or asset operators. The mobile asset application server 14 identifies how to appropriately relay the message to the intended recipient, for example, by asset operator, asset identification, etc. The received message may be displayed on the display 41, 50, played back over a speaker, etc. The mobile asset application server 14 may also receive responses and relay those responses to the appropriate message sender. Moreover, messages may be broadcast to groups of asset operators and/or assets, and the mobile asset application server 14 can track the status of transmitted messages.

As an example, when an operator logs into an asset, the wireless communications interface controller 50 may transmit the operator ID and relevant tracking information, such as a corresponding asset identification to the mobile asset application server 14. By knowing the operator ID and corresponding asset ID, instant messaging systems can be manipulated. Also, the mobile asset application server 14 can be used to implement and/or integrate with a presence and awareness system in a mobile asset environment. That is, as the operator moves around a mobile environment, the mobile asset application server 14 can be used to track that operator.

Thus, as an example, position information may be received for a plurality of materials handling vehicles at the applications server 14. The applications server 14 can select one of the materials handling vehicles whose position is closest to a designated location based upon the received position information and wirelessly communicate a page message to the selected one of the materials handling vehicles, such as to issue a task related request or otherwise convey information.

Work Area Sensing

Figure 16:
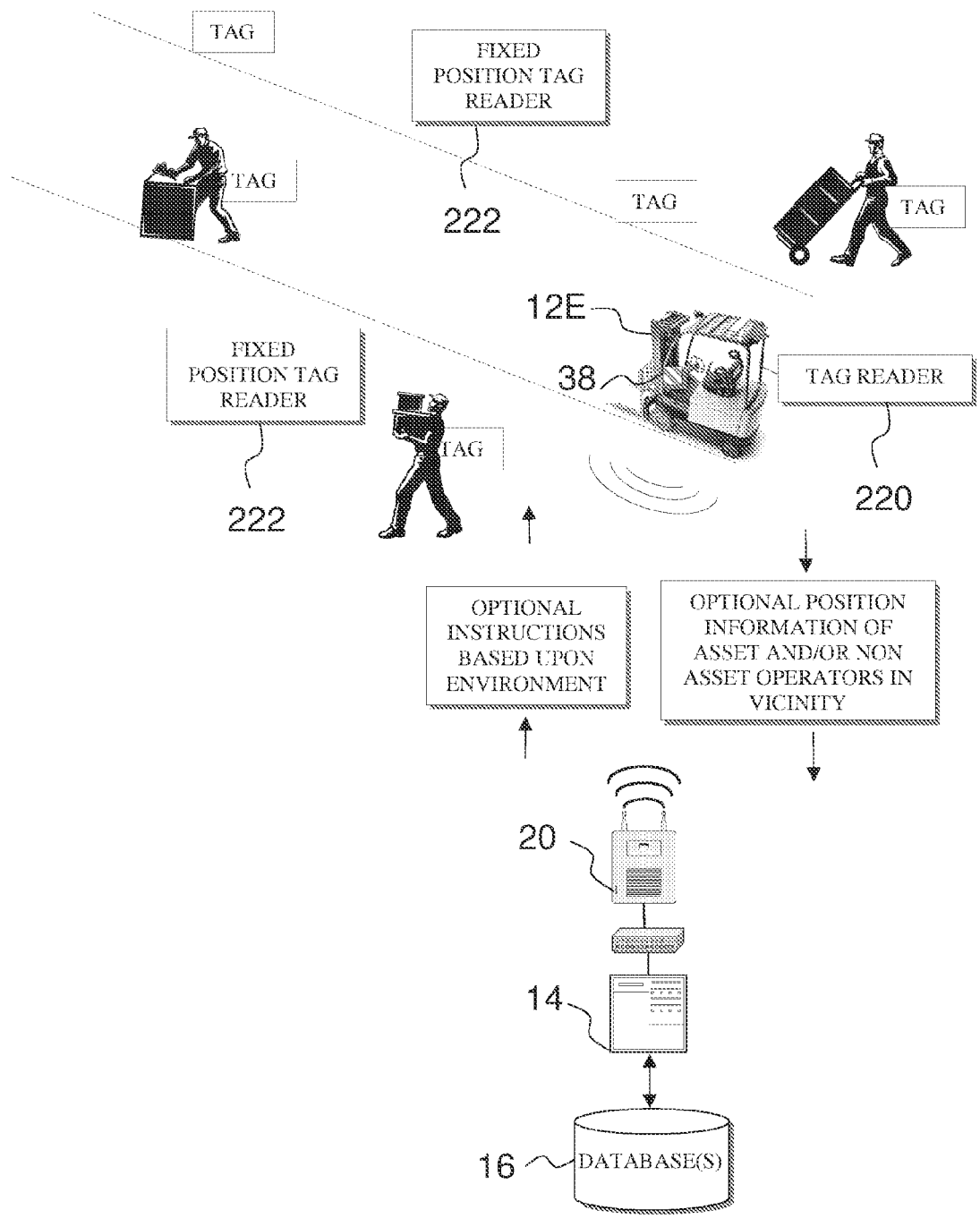
FIG. 16 is a block diagram of an exemplary system for wireless communication of environmental information.

Referring to FIG. 16, in another exemplary implementation, tags may be provided to asset operators and to other workers that may be in the working environment. Using a suitable tag reader 220 incorporated into the mobile asset 12E, or in data collected by fixed position tag readers 220, the mobile asset application server 14 can track not only mobile assets and asset operators, but others in proximity to the mobile assets. Thus, data may be mined that is directed towards understanding the relationships between mobile assets and other workers. By knowing the location of persons and the location of mobile assets, a site operator may be able to associate labor costs to site areas and products within the facility. This enables the asset manufacturer to provide services such as optimization counseling.

Further, by knowing the locations of persons in proximity to the mobile assets 12, such as by equipping such persons with suitable tags and by providing fixed location readers and/or equipping mobile assets 12 with corresponding readers, the mobile asset application server 14 and/or mobile assets 12 may implement appropriate actions and make intelligent decisions. For example, the operator of a forklift truck may be a highly skilled driver but may be working in a crowded work environment. Thus, one or more controls or operational parameters, e.g., top speed of the forklift truck may be adjusted to accommodate the environment and its surrounding. In this regard, sensors such as ground sensors, surface change sensors, ultrasonic sensors and other technologies may be used in addition to or in lieu of tags to implement work environment control and/or parameter adjustments of a mobile asset 12.

The tags, such as RFID tags, may be integrated into protective or other gear worn by asset operators and other workers in the work vicinity. This may further enable automated or semi-automated login to the mobile asset prior to operation of the mobile asset 12.

Tags such as those utilizing RFID technologies may also be integrated into mobile asset components and accessories. For example, if an operator is required to wear a harness, a tag can be incorporated into that harness. Accordingly, the tag is read to make sure that the operator is appropriately clipped in, etc.

For example, if the operator is not clipped in to an appropriate harness, the control of the mobile asset 12 may be disabled or performance may be altered in a way that provides an appropriate work environment for the user. Additionally, warnings, such as signals and other information can be conveyed to the operator as well as the mobile asset application server 14 for logging the event. For example, if a user has a cage located on the forks of a forklift truck, but the cage is not properly attached and the operator tries to lift the forks, the mobile asset can detect, via the tag or other appropriate sensing technology, that the cage is not appropriately attached and installed and take other appropriate action. As such, the maximum allowable height of the forks may be limited and/or fork lifting operations may be disabled. Further, a message may be sent back to the mobile asset application server 14 indicating that the operator has attempted to implement the activity.

Moreover, tags can be installed throughout an area traveled by the mobile assets 12, such as on racks at the ends of aisles in a warehouse environment. As a mobile asset 12 is traveling down an aisle, an asset tag reader can read the tags. Thus, for example, based upon a recognition that a corresponding tag is at the end of an aisle, the asset may utilize this information to implement automatic speed adjustment, etc.

Moreover, the tag reader in the mobile asset 12 can inform the mobile asset application server 14 as to its location. The mobile asset application server 14 can thus track the location of each of the mobile assets 12. By knowing the location of each mobile asset 12, the mobile asset application server 14 can send messages to redirect select mobile assets 12 based upon the known locations of other mobile assets 12, such as for workflow management. As an example, a "hot spot" may be identified by detecting a number of mobile assets 12 in a small area of a facility. This may trigger a workflow that reassigns tasks to one or more of the mobile assets 12, such as by a WMS system, so that each mobile asset 12 can perform more efficiently.

Weight Sensing

A mobile asset 12 such as a materials handling vehicle, may be able to sense the weight of the operator. For example, certain mobile assets, such as forklift trucks, can measure the back-pressure in the hydraulic system, e.g., using a suitable transducer. The mobile asset application server 14 may use this information to make intelligent decisions. As an example, the sensed weight on the forklift truck may be used to validate that the operator logging onto the system is the true person corresponding to the identity of the user logon, such as by comparing the measured weight to a previously stored weight. While not conclusory, a weight sensing scheme may provide a general check against the entered operator ID.

Environment Integration

Additionally, smart fixtures may be integrated into the work environment and brought into communication with a mobile asset information linking device 38, via the mobile asset application server 14. For example, as a mobile asset 12 approaches a dark corner of a warehouse, the mobile asset application server 14, which is tracking the location of the mobile asset 12, may send messages to other intelligent devices within the facility to assist the asset operator, such as by instructing intelligent light fixtures to automatically turn on while items are being picked. Similarly, the mobile asset application server 14 can instruct the intelligent light fixtures to turn off after the mobile asset drives out of the area.

Mobile Asset Accessories

A mobile asset information linking device 38 may also be integrated with digital cameras, weight detection and other asset mounted accessories. As an example, in a warehouse operation, during an unloading operation, as forklift mobile assets are driving in and out of a semi-tractor or other suitable location, sensors related to the operation of the forks can verify the weight of the pallets on the forks. The weights can be transmitted to the mobile asset application server 14, which can compare each received weight measurement against an expected or anticipated range of weight for the pallet.

Further, cameras may be utilized to take pictures of the condition of the merchandise before it is received into and/or leaves the warehouse for purposes of quality control and to document damaged merchandise for returns. The image data may be automatically transmitted to an appropriate server of the computer system via the corresponding information linking device 38. Thus, confirmation, inspection and other similar features can be integrated with receiving departments, shipping departments or other suitable operations. Thus, collected information, digital images and other relevant data may also be wirelessly transmitted to the mobile asset application server 14.

An Intra-Enterprise User At the Asset Interface

The asset interface may also be used by an intra enterprise worker who is not an asset operator, such as a manager or supervisor, etc. As noted in an example provided above, if an operator is involved in a collision or other activity that triggers impact detectors, a manager may be required to clear or otherwise re-enable the asset for operation. As such, the wireless communication interface controller 50 may recognize a user identification code as that of a supervisor, and enable access to certain features, parameters, menu items, etc., as the specific task requires, which are otherwise hidden from the asset operator. The supervisor may also use the asset interface to perform tasks such as checking operator statistics or for performing other tasks. Therefore, the screens and information that are of importance to a non-operator authorized user, such as a floor manager, may be tailored to help that person to complete their jobs so that the asset operator can get logged back in and back to work relatively quickly.

A Third Party Authorized User At the Asset Interface

A third party, such as a maintenance, service or repair technician may be required to perform service repairs, planned maintenance, diagnostics and other activities associated with a mobile asset 12, thus requiring interaction at the asset interface. Under this arrangement, the wireless communications interface controller 50 may interact with the display 46, 52, the mobile asset application server 14 and/or remote server 30 to provide appropriate information to the third party user. Again, the information available to a third party user at the asset interface is likely different than the information required by an asset operator. In this regard, the information required by the third party user may be wirelessly transmitted to the corresponding mobile asset from a network resource, e.g., the mobile asset application server 14.

Moreover, in some instances, the required information may not be of general knowledge to the enterprise. Rather, the required information may comprise, for example, proprietary information that is not publicly disclosed. Where a system such as that described with reference to FIG. 3 is implemented, the appropriate material may be securely transmitted to the particular mobile asset 12 from a trusted third party server 30. For example, a manufacturer of the mobile asset 12 may maintain a server 30 that is communicably coupled to the enterprise 26 via the network 32, such as the Internet. A service representative performing repairs on behalf of the asset manufacturer may be able to request the appropriate repair information from the remote server 30 from the mobile asset interface, e.g., in a manner analogous to that described with reference to FIG. 10. The appropriate information is sent from the remote server 30 to the mobile asset application server 14, where the information is securely relayed to the appropriate mobile asset 12. Under this arrangement, the remainder of the enterprise 26 may not have access to the requested proprietary data.

The service technician may also be able to automatically order the appropriate required parts, even from resources outside the enterprise, by initiating a service or parts order with the remote server 30. In addition, the mobile asset application server 14 may also update intra-enterprise maintenance records, adjust parts inventories, etc., all from the mobile asset interface.

Miscellaneous

The wireless communications interface controller 50 may also interact with the mobile asset application server 14 at appropriate times to provide an asset operator with performance statistics. For example, an operator may want to view performance metrics and other data that is related to the mobile asset or the operator's assigned tasks.

The Fixed Station Intra-Enterprise Interface

The enterprise may further implement one or more fixed station intra-enterprise interfaces. Typically, these interfaces are utilized to interact with the mobile asset application server 14 to derive back-end types of operations such as to configure the wireless communication system and/or to configure mobile asset information linking devices 38 for communication across the wireless network, to generate reports, statistics and other relevant usage information, etc. Accordingly, one or more dashboard views may be provided for customized management of the mobile assets, to summarize data that is of interest to the enterprise operator from a managerial, supervisory or other appropriate level.

Asset Maintenance Schedules

The mobile asset application server 14 may accumulate asset usage information, for example, from the collected mobile asset data as described more fully herein, to automatically generate notifications of anticipated maintenance, initiate workflow, such as by sending maintenance alerts and/or e-mails to designated personnel, pre-order repair parts, etc.

As an example, a preventative maintenance countdown timer may be initiated on the mobile asset application server 14 for various features of each mobile asset 12, such as steering, lifting, traction, etc. This information can be tied back to the mobile asset 12, via a wireless communication to the corresponding mobile asset information linking device 38, which can implement an appropriate action, such as by turning on a light on a display that tells the operator or maintenance person that scheduled maintenance is due. This can also trigger a workflow operation that sends an e-mail to the maintenance department as well, so that the planned asset maintenance can be appropriately implemented.

Moreover, the information linking device 38 may be utilized to implement a "lock-out" or "tag-out" operation to temporarily take the corresponding vehicle out of operation until the planned maintenance, required servicing, etc. can be suitably implemented. As an example, the processor 50 may interact with the vehicle power enable/conditioning 52 to implement a "lock-out" in response to wirelessly receiving a suitable message. Alternatively, the processor 50 may disable or limit specific features of the vehicle, such as by communicating commands to the appropriate vehicle control modules over the vehicle network bus. Thus, the controller 50 may disable use of the vehicle forks, but enable traction control so that the vehicle may be driven to a suitable location for the required maintenance.

For example, a planned maintenance application may call for a truck to be serviced at a certain time. However, that time may coincide with a time when receiving lanes are full due to incoming inventory. As such, the system may look not only to intrinsic data collected from the mobile assets 12 via the mobile asset information linking device 38 on the mobile assets, but also enterprise wide business flow data, trends and other usage patterns detected, mined, provided or otherwise made available to the mobile asset application server 14.

Interacting with the mobile asset application server 14, maintenance information may be programmed in a management control module of the server software. For example, a schedule of maintenance tasks may be established based upon appropriate parameters, such as usage and/or time. Thus, for each tracked mobile asset, each component may have a unique inspection interval so that brakes may be set to a first predetermined number of hours between scheduled maintenance and hydraulics may be set to a different number of hours between scheduled maintenance, etc. Additionally preventative maintenance history listings and other maintenance related reports may be generated.

This may be useful, for example, to determine the percentage of utilization versus anticipated usage reports. Operator time spent on machine versus time spent actually working may also be gauged. Thus, operator hours versus equipment hours can be measured. Using this and similar data, a site operator can analyze anticipated use and balance the anticipated use with recorded actual usage. This allows adjustments to be made in the fleet management of enterprise assets.

Reporting

The mobile asset application server 14 may be preconfigured to provide reports for management and analysis in areas such as equipment usage, operator licensing/certification, equipment checklist and preventative maintenance. The mobile asset application server 14 may also facilitate a mobile asset dashboard, which may comprise, for example, a customized interface that allows managers to monitor key performance indicators (KPI), and to realize role-based, content sensitive visibility of important business metrics in real time. Dashboard information can thus be utilized for monitoring and analyzing events in support of taking actions to improve and optimize a corresponding business, e.g., by presenting a "live" view of the current state of the monitored events, by querying KPIs and then rendering the KPI data values through dashboard components such as gauges, tables and other visual metaphors, such as reports, charts, graphs, tree visual representations, etc.

Smaller enterprise operators may not have the time, expertise or capabilities to analyze the data collected by the mobile asset application server 14. As such, these enterprise operators may chose to share some or all of the collected data with a trusted third party, for example, by transmitting the data to the remote server 30. In this regard, a trusted third party may comprise the asset manufacturer who can understand the data and provide fleet selection and management advice, maintenance advice, etc.

In general, exemplary information that may be useful to a supervisor may comprise, for example, who's logged onto the mobile assets 12, how long are these operators actually using the mobile assets 12, how much work is being performed as a function of time of usage of the mobile assets 12, where are the mobile assets 12 in the site, when are the mobile assets 12 due for maintenance, when can maintenance be scheduled in a way that minimally disrupts other work related activities, etc.

From an enterprise perspective it is possible to monitor labor costs which may reduce the cost of ownership of a corresponding fleet of mobile assets 12 maintained at a site. For example, data mined from the mobile asset application server 14 may reveal how long each operator is actually performing lifting operations, driving operations, the distance that the mobile asset is being driven, and other asset operating characteristics. This data mining may assist the site operator in optimizing site layout, selecting the most appropriate mobile asset for the activities implemented at the site, and/or performing other optimizations. For example, if a lightweight mobile asset 12 is approaching the weight limits of its forks, an analysis of data collected by the mobile asset application server 14 may recognize these events and recommend that those tasks be re-allocated to another mobile asset 12 in the fleet that has capabilities better suited for those tasks.

The site operator may also interact with the mobile asset application server 14 to set up operator authorization, which may be based upon factors such as location, types of mobile assets, license/certifications, asset serial numbers, time, day, date, etc.

A user may also interact with the mobile asset application server 14 to implement the paging system described more fully herein. For example, from a dialog box of the mobile asset application server software, a user selects the mobile asset and/or mobile asset operator to be paged. The user then types a message into an appropriate dialog box and the mobile asset application server software delivers the message to the appropriate mobile asset(s) via the mobile asset information linking device 38 associated with the appropriate mobile asset(s) being paged.

An administrator at the mobile asset application server 14 may also be able to lockout mobile assets 12, for example, to suspended operation of a select mobile asset 12 for a prescribed period of time or until the supervisor releases that mobile asset 12 back to the fleet. This may be useful, for example, to ensure that maintenance and other routine repairs are done, or to implement other defined tasks. For example, a system supervisor may enter a lockout command into an appropriate dialog box, and select either an asset operator, group of asset operators, mobile asset or group of mobile assets to be locked out. The mobile asset application server 14 sends a lockout message to all appropriate mobile asset information linking devices 38 to effect the desired lockout transaction. The lockout may then expire, such as after a predetermined period of time, or the supervisor may manually initiate a corresponding process to release the previously locked mobile asset(s)/operator(s).

Training Recommendations

The mobile asset application server data may also be analyzed to determine upcoming training needs. For example, by monitoring recorded data, such as the time a user operates a mobile asset, whether there has been some inefficiencies in the asset operation, whether there were impacts recorded, etc., specific training recommendations and needs can be implemented.

Workflow Scheduling

A mobile asset information linking device 38 in conjunction with the mobile asset application server 14 may also be utilized to predict and/or recommend mobile asset related workflow, such as when a forklift should be brought in for battery charging. For example, the mobile asset information linking device 38 can monitor the battery charge, and inform the application server 14 that a battery charge will be required with a predetermined range of time. The application server 14 can monitor peak times in which all of the monitored mobile assets are active/inactive etc., and a schedule can be created that sequences the mobile assets for battery charge or replacement to improve workflow.

Inter-Enterprise Interface

Depending upon the implementation, an enterprise may allow a trusted third party to connect to the mobile asset application server 14 and/or to specific mobile asset information linking devices 38. For example, the remote server 30 illustrated in FIGS. 3 and 4 may communicate with the mobile asset application server 14 via the network 32. In this regard, data that is deemed appropriate, may be shared with the parties of interest. For example, it may be advantageous to the enterprise 26 to share data that may be of interest to the mobile asset manufacturer, or to the asset component part/peripheral manufacturer, as suggested by the illustrative examples described more fully herein.

A Remote Service Diagnostic Tool

The mobile asset application server 14 may be utilized to enable a remote service diagnostic tool. For example, a predetermined event may be detected that is associated with an error in operation of a materials handling vehicle. The processor of the interface controller 50 may be configured to initiate a remote diagnostic check of at least one component of the materials handling vehicle and information may be gathered that is related to at least one condition of the materials handling vehicle by communicating the gathered information across the materials handling vehicle network bus. Information concerning the error event may be wirelessly communicated between the application server 14 and the materials handling vehicle via the transceiver 46 by communicating the gathered information to the application server 14, communicating the gathered information from the application server to a remote third party server for remote service diagnostics and receiving a message back to the server computer from the third party server corresponding to the remote service diagnostics.

A mobile asset manufacturer may, for example, remotely diagnose a problem, understand the issues and correct the problem with the most appropriate personnel. This may comprise, for example, implementing a software upgrade, patch or fix by electronically transmitting the patch to the mobile asset for automated installation as described more fully herein. It may also comprise sending appropriate diagnostic data to service representatives so that they may bring the correct part on site for a repair, or to select the most appropriate personnel to send to the site to implement the repair or other asset activity.

The manufacturer may also be uniquely positioned to analyze the collected data for preventative, diagnostic and/or anticipatory maintenance and repair by monitoring the mobile asset for symptoms that may lead to eventual problems that need to be addressed. Accordingly, by providing appropriate details of asset performance back to its manufacturer, proactive steps may be taken.

Remote Set Up And Configuration

If a mobile asset 12 comprises upgradeable software, firmware, etc., the mobile asset information linking device 38 can be used as remote setup tool that allows a third party to remotely access the mobile asset 12. For example, an asset manufacturer or asset component/peripheral manufacturer may remotely communicate with the mobile asset 12 to perform upgrades and patches and other maintenance related to software related to the information linking device 38 and/or to software related to asset components in a remote manner. Further, purchased upgrades may be enabled by remotely unlocking or otherwise enabling software features of components of the mobile asset 12 as part of the corresponding upgrade plan.

Remote Monitoring Service

A trusted third party, such as the mobile asset manufacturer, may also become proactive in providing monitoring services with regard to asset operation. For example, if an impact or other relevant event is detected involving a mobile asset 12 at the remote server 30, such as via a message received from a corresponding mobile asset application server 14, an appropriate action may be taken. That appropriate action may comprise, for example, notifying an enterprise manager of the identity of the asset involved in the impact, logging data, triggering workflows, etc. Further, if the impact caused damage to the asset, a manufacturer representative may better be positioned to assess the extent of the damage and take proactive measures, such as preparing a maintenance order and pre-ordering replacement parts necessary to return the asset back to satisfactory functioning condition.

The manufacturer may also be able to compare the collected data of a particular enterprise 26 and provide indicators, either directly or indirectly, of where the asset operators in that enterprise 26 are underperforming against similar workers in other enterprises 26, outperforming similar workers in similar enterprises 26, etc.

The trusted third party, such as the asset manufacturer, can also monitor asset usage, such as where planned maintenance schedules have been established, so that the enterprise manager does not need to make the appropriate service calls when the mobile assets are ready for maintenance. Rather, the manufacturer will already know when the appropriate maintenance thresholds have been met and implement the appropriate maintenance strategy.

Such an approach may also enable new business models for determining lease rates for mobile assets 12. For example, lease fees may be charged by hours of use, distance traveled, pounds lifted, etc.

Product Improvement/Life Monitoring

Moreover, maintenance records and other information pertinent to asset usage that is shared between the enterprise 26 and the manufacturer may provide manufacturer specific data, such as real-world component life testing data. The mobile asset application server 14 may also be used to mine ergonomic data, use data, wear data and other relevant information that is of interest to the asset manufacturer. For example, by monitoring feature usage, i.e., what features are being used and the order and sequence in which features of the various monitored mobile assets are being used, it may be possible to infer ergonomic considerations to enable feedback driven redesign and new product development. For example, a control or feature that is implemented but never used may be eliminated from future models. Alternatively, it may be learned that a control is being unused or underutilized because of the inconvenience from an ergonomic standpoint. This may trigger a redesign or reimplementation of those features into more ergonomic friendly implementations.

Based on any number of factors including for example login ID codes and associated metadata, sensors on the mobile asset 12 and other extrinsic sources of information, the mobile asset application server 14 can be used to mine ergonomic indicators of mobile asset operator characteristics. In a simple example, each user may have metadata stored on the mobile asset application server 14 that is associated with their login. This metadata can comprise, for example, whether or not the operator is male or female, the height and or weight of the operator and/or any specific physical characteristics of the operator. Each time the operator logs onto the asset, the mobile asset application server 14 gains information that can be analyzed to determine usage of the mobile asset from an ergonomics perspective. The operator metadata may be correlated, mined and otherwise analyzed against collected data such as how many times each operator is pushing certain switches, initiating certain control sequences and performing other mobile asset operation tasks.

Third Party Value Added Service

Either an enterprise expert or a trusted third party, such as the mobile asset manufacturer, may be able to mine data collected by the mobile asset application server 14 to perform a flow analysis where a floor plan is mapped out and WMS system recommendations or changes may be suggested to the enterprise operator. This may affect mobile asset driving patterns, site layout, etc. Thus, the asset manufacturer may become active in improving the efficiency of its customers.

As another example, if a mobile asset 12 is being underutilized, such as a high capacity lift truck is detected as only lifting nominal weights, the manufacturer may be in a unique position to recommend that the site change the type of mobile asset 12 used for the types of identified tasks. Yet another example, by understanding the capabilities of each mobile asset 12, such as size, speed, lifting capability, etc., recommendations may be given to the site operator that will affect the way that the site is organized so as to leverage the strengths of each mobile asset 12 to its particular work environment.

Yet a further example, by knowing and understanding the jobs that are being performed by the mobile assets 12 at a site, the asset manufacturer can analyze the data and utilize specialized knowledge and insight not available to the operators to recommend the purchase of accessories and or optional products that may simplify, reduce the cost of, or otherwise enable more efficient implementation of the identified tasks performed by the mobile assets 12.

Certified Replacement Part Tags

RFID or other suitable tagging technology can be utilized in conjunction with the wireless capabilities integrated into the wireless mobile asset system in a number of ways to provide enhanced features and capabilities. As an illustrative example, components of the mobile asset 12 may be identified with an RFID or other suitable tag. If maintenance requires that the component be replaced, the control electronics of the mobile asset may verify that the tag on the replacement component meet certain qualifying conditions and is thus suitable for operation. This may be utilized to gain an understanding of components, such as wear parts that require periodic replacement, and it may be used to ensure that components are being replaced with properly qualified replacement parts. The information collected from reading the tags may be communicated to the mobile asset application server 14 and/or the data may be communicated to the remote server, such as the manufacturer's server 30 for data analysis.

Having thus described the invention of the present application in detail and by reference to embodiments thereof, it will be apparent that modifications and variations are possible without departing from the scope of the invention defined in the appended claims.

What is claimed is:

1. A method of wirelessly interacting with a materials handling vehicle to implement a position dependent operation of the materials handling vehicle, the method comprising:
   verifying that an operator logging onto the materials handling vehicle is authorized to operate the materials handling vehicle;
   communicating an operator identification of the operator across a wireless computing environment to a corresponding server computer via a transceiver on the materials handling vehicle;
   obtaining by a processor, from at least one device on the materials handling vehicle, information relating to the position of the materials handling vehicle;
   receiving from the server computer by the processor on the materials handling vehicle, information regarding a geofence known by the server;
   performing in response to comparing a position of the materials handling vehicle determined based upon the information obtained from the device, to the geofence:
      identifying a vehicle condition based upon a current operating characteristic of the materials handling vehicle; and
      communicating information across a vehicle network bus by the processor on the materials handling vehicle, to at least one component of the materials handling vehicle, to perform a predetermined action in response to the information of the geofence based upon the identified vehicle condition.

2. The method according to claim 1, wherein:
communicating information across a vehicle network bus by the processor on the materials handling vehicle, comprises:
   interacting with at least one materials handling vehicle system across a Controller Area Network (CAN) bus.

3. The method according to claim 2, wherein:
interacting with at least one materials handling vehicle system across a Controller Area Network (CAN) bus, comprises:
   communicating over the Controller Area Network bus to cause the materials handling vehicle to implement an evasive maneuver to avoid the geofence.

4. The method according to claim 1, wherein:
identifying a vehicle condition comprises:
   identifying the weight of the load carried on the forks of the materials handling vehicle; and
communicating information across a vehicle network bus comprises:
   implementing a corrective action that is selected based upon the weight of the load carried by the materials handling vehicle.

5. The method according to claim 1, wherein:
identifying a vehicle condition comprises:
   identifying a type of the materials handling vehicle; and
communicating information across a vehicle network bus comprises:
   implementing a corrective action that is selected based upon the identified type of the materials handling vehicle.

6. The method according to claim 5, wherein:
implementing a corrective action that is selected based upon the type of materials handling vehicle comprises:
   prohibiting a truck from entering a region that the type of materials handling vehicle is unauthorized to enter.

7. The method according to claim 1, wherein:
identifying a vehicle condition comprises:
   identifying a speed of the materials handling vehicle; and
communicating information across a vehicle network bus comprises:
   implementing a corrective action that is selected based upon the identified speed of the materials handling vehicle.

8. The method according to claim 1, wherein:
identifying a vehicle condition comprises:
   identifying a direction of travel of the materials handling vehicle; and
communicating information across a vehicle network bus comprises:
   implementing a corrective action that is selected based upon the identified direction of travel of the materials handling vehicle.

9. The method according to claim 1, wherein:
obtaining by a processor from at least one device on the materials handling vehicle, information relating to the position of the materials handling vehicle, comprises:
   communicating with a position determining device on the materials handling vehicle that reads tags positioned within an environment.

10. The method according to claim 9, wherein:
communicating with a position determining device comprises:
   communicating with a radio frequency identification (RFID) reader on the materials handling vehicle that reads RFID tags positioned within the environment.

11. The method according to claim 9, further comprising:
utilizing the position determining device on the materials handling vehicle to read fixed position tags.

12. The method according to claim 9, further comprising:
utilizing the position determining device on the materials handling vehicle to a read mobile tag proximate to the materials handling vehicle.

13. The method according to claim 1, wherein:
receiving from the server computer by the processor on the materials handling vehicle, information regarding a geofence known by the server, comprises:
identifying the geofence based upon the operator identification of the vehicle operator.

14. The method according to claim 1, further comprising:
communicating the obtained position related information from the materials handling vehicle to the server computer;

receiving a command from the server computer by the processor on the materials handling vehicle instructing the materials handling vehicle how to respond to the geofence, wherein;

the command is sent from the server in response to the communicated position related information; and the command is based upon the communicated position related information of the materials handling vehicle relative to the geofence, and the operator identification of the vehicle operator.

* * * * *